(12) United States Patent
Stanger

(10) Patent No.: US 8,671,639 B2
(45) Date of Patent: Mar. 18, 2014

(54) ROOF PANEL FOR ROOFING SYSTEM AND ROOF STRUCTURE

(75) Inventor: Colin Neil Stanger, Toronto (CA)

(73) Assignee: Tectusol, Inc., Toronto, Ontario (CA)

( * ) Notice: Subject to any disclaimer, the term of this patent is extended or adjusted under 35 U.S.C. 154(b) by 842 days.

(21) Appl. No.: 12/599,209

(22) PCT Filed: May 8, 2008

(86) PCT No.: PCT/CA2008/000875
§ 371 (c)(1),
(2), (4) Date: Jan. 12, 2010

(87) PCT Pub. No.: WO2008/134893
PCT Pub. Date: Nov. 13, 2008

(65) Prior Publication Data
US 2010/0132275 A1 Jun. 3, 2010

Related U.S. Application Data

(60) Provisional application No. 60/928,073, filed on May 8, 2007.

(51) Int. Cl.
*E04D 1/00* (2006.01)
*E04B 2/00* (2006.01)

(52) U.S. Cl.
USPC .................................. 52/531; 52/520; 52/529

(58) Field of Classification Search
USPC ............... 52/173.3, 91.3, 506.01, 588.1, 478, 52/520, 522, 528, 529, 530, 531, 537, 543, 52/545
See application file for complete search history.

(56) References Cited

U.S. PATENT DOCUMENTS

| 1,163,556 | A | * | 12/1915 | Probert | 52/531 |
| 1,292,960 | A | * | 1/1919 | Owens | 52/528 |
| 2,148,434 | A | * | 2/1939 | Calkins et al. | 52/531 |
| 3,358,355 | A | * | 12/1967 | Youssi et al. | 29/424 |
| 4,266,385 | A | * | 5/1981 | Oehlert | 52/521 |

(Continued)

FOREIGN PATENT DOCUMENTS

| CA | 2242478 | 2/1999 |
| JP | 10008650 | 1/1998 |

OTHER PUBLICATIONS

International Search Report of PCT/CA2008/000875 dated Aug. 19, 2008.

*Primary Examiner* — Andrew Triggs
(74) *Attorney, Agent, or Firm* — Etienee de Villiers; Dimock Stratton LLP

(57) ABSTRACT

A roof panel system assembled from roof panels comprising a panel portion bounded along a support edge by a support element and along an opposed cover edge by a cover element. The cover element adapted to rest upon and provide resilient sealing and locking engagement with the support element of an adjacent panel. The support element adapted to provide resilient support and locking engagement with the cover element of a second adjacent panel. In an embodiment a panel cover is provided for shielding an upper surface of the panel portion and adapted to inter-fit and lock with engaged support element and cover element pairs along the support element and the cover element of the panel when the panel is engaged with adjacent panels when assembled. In an embodiment contoured insulated panels are provided as a base to support the panels. The contours providing passageways to allow the transport of air beneath the panels when assembled.

20 Claims, 20 Drawing Sheets

(56) References Cited

U.S. PATENT DOCUMENTS

| | | | |
|---|---|---|---|
| 4,580,384 A * | 4/1986 | Hutcheson | 52/537 |
| 4,610,121 A * | 9/1986 | Schenach | 52/520 |
| 4,878,331 A * | 11/1989 | Taylor | 52/519 |
| 4,926,608 A * | 5/1990 | Beauregard | 52/522 |
| 5,140,793 A * | 8/1992 | Knudson | 52/520 |
| 5,201,158 A * | 4/1993 | Bayley et al. | 52/537 |
| 5,247,772 A * | 9/1993 | Greenberg | 52/531 |
| 5,519,974 A * | 5/1996 | Greenberg | 52/518 |
| 5,535,567 A * | 7/1996 | Cahoon | 52/520 |
| 5,725,201 A * | 3/1998 | Parth | 256/24 |
| 5,855,101 A | 1/1999 | Schulte et al. | |
| 6,170,206 B1 * | 1/2001 | Coolman | 52/200 |
| 6,576,830 B2 * | 6/2003 | Nagao et al. | 136/244 |
| 6,606,830 B2 * | 8/2003 | Nagao et al. | 52/173.3 |
| 7,021,023 B2 * | 4/2006 | Rood, Jr. | 52/748.1 |
| 7,063,126 B1 * | 6/2006 | Morris | 165/53 |
| 7,818,937 B2 * | 10/2010 | Monsieur | 52/531 |
| 2006/0059836 A1 * | 3/2006 | Monsieur | 52/588.1 |
| 2010/0132275 A1 * | 6/2010 | Stanger | 52/173.3 |

* cited by examiner

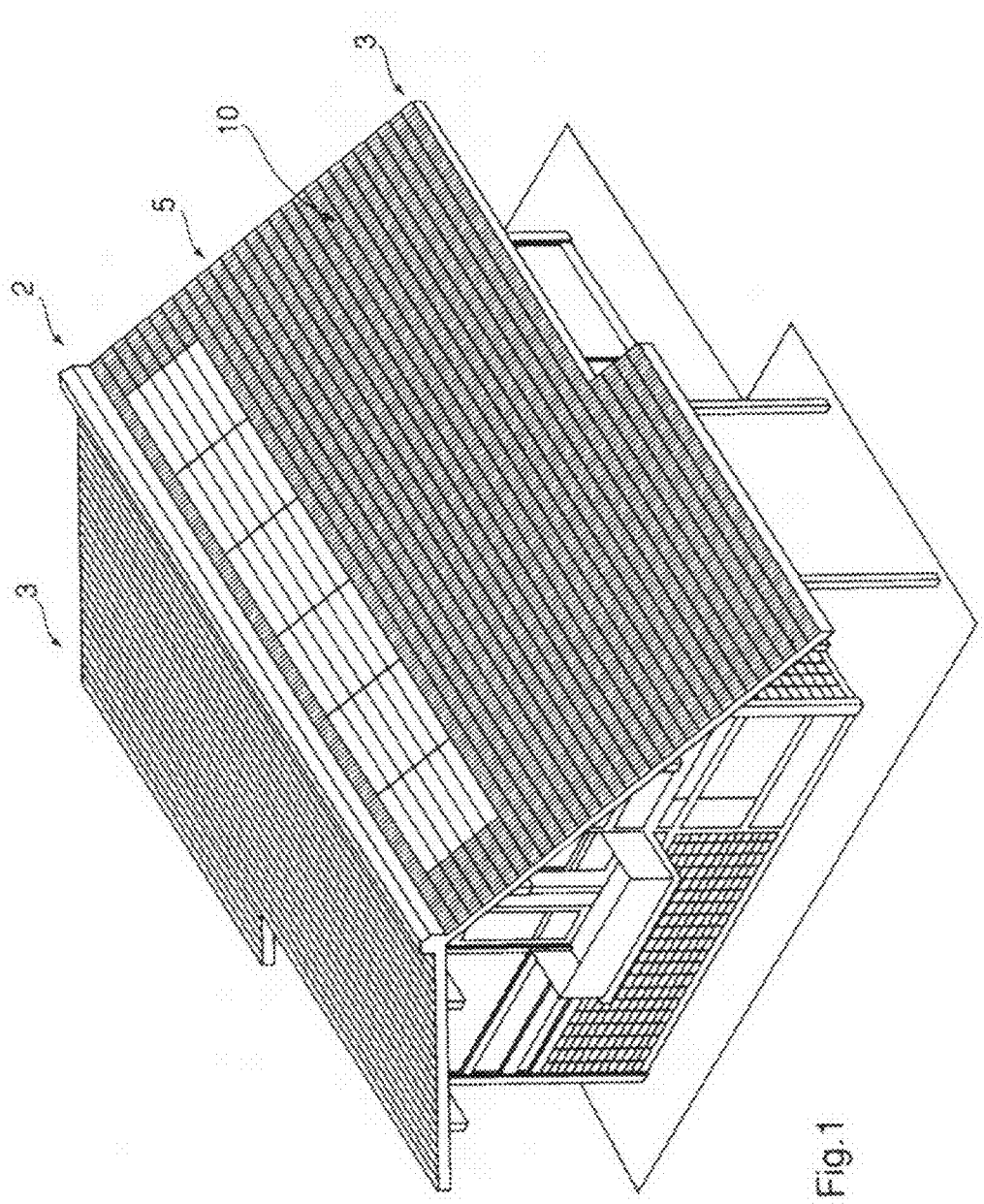

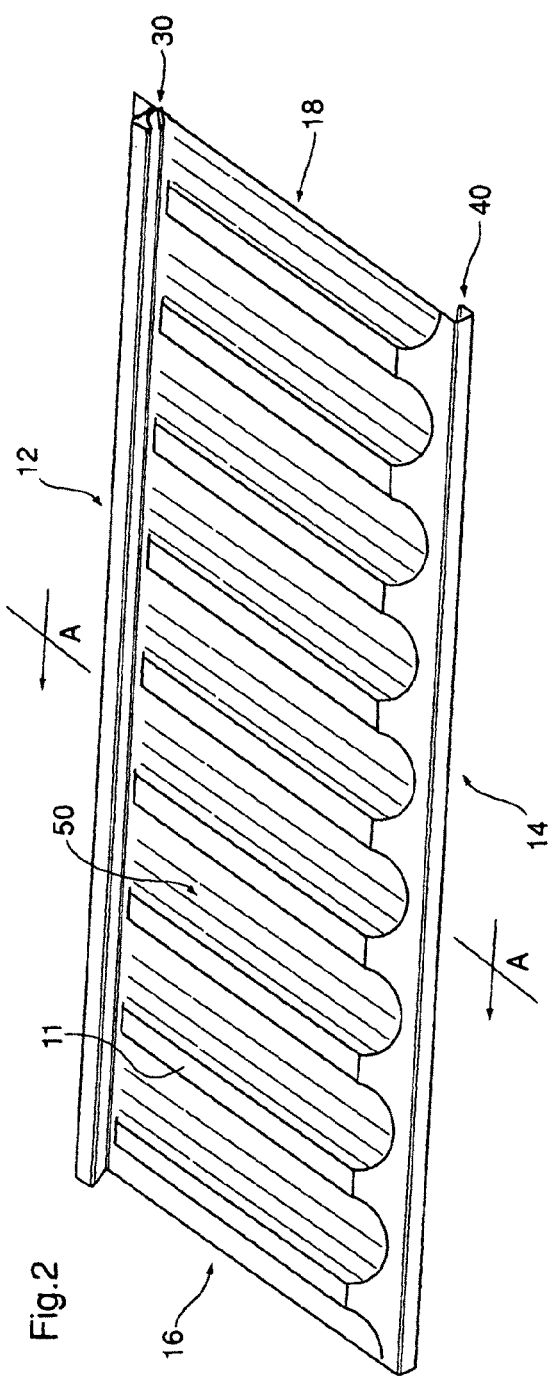
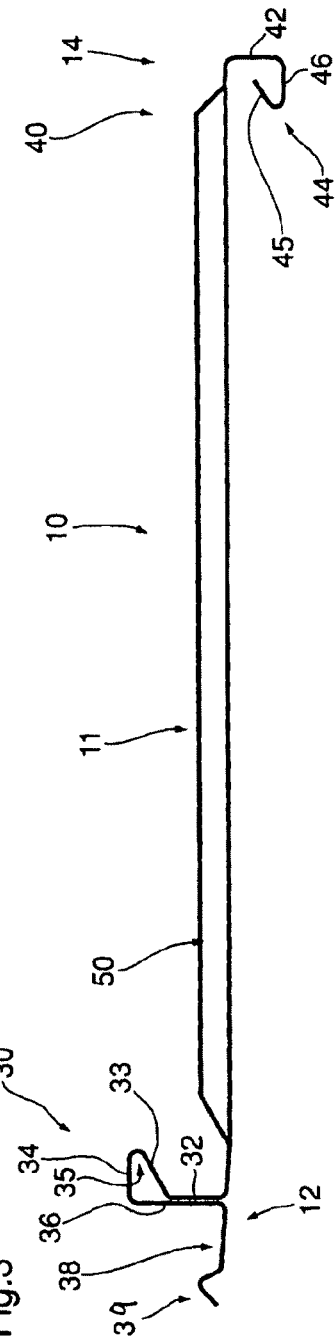

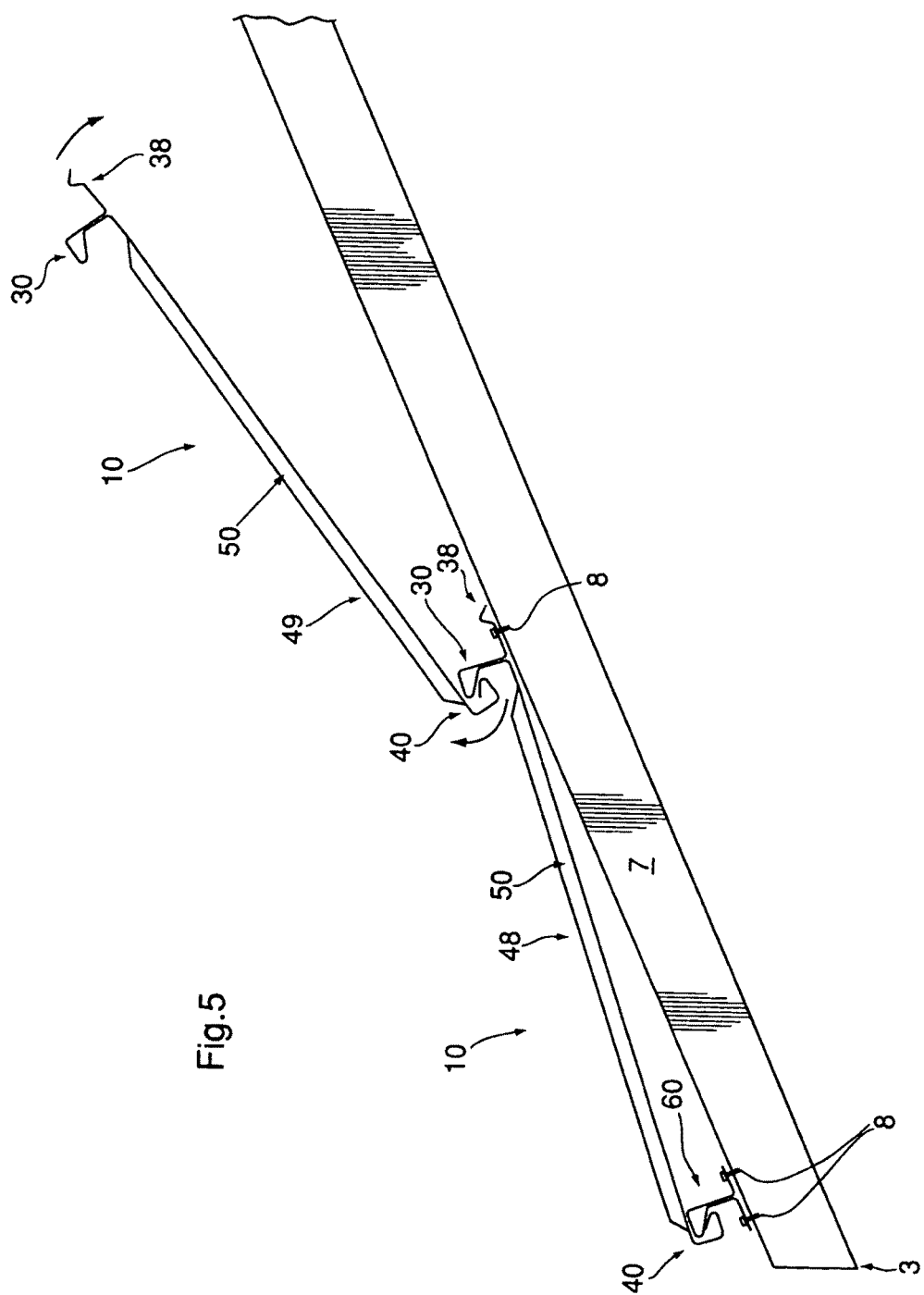

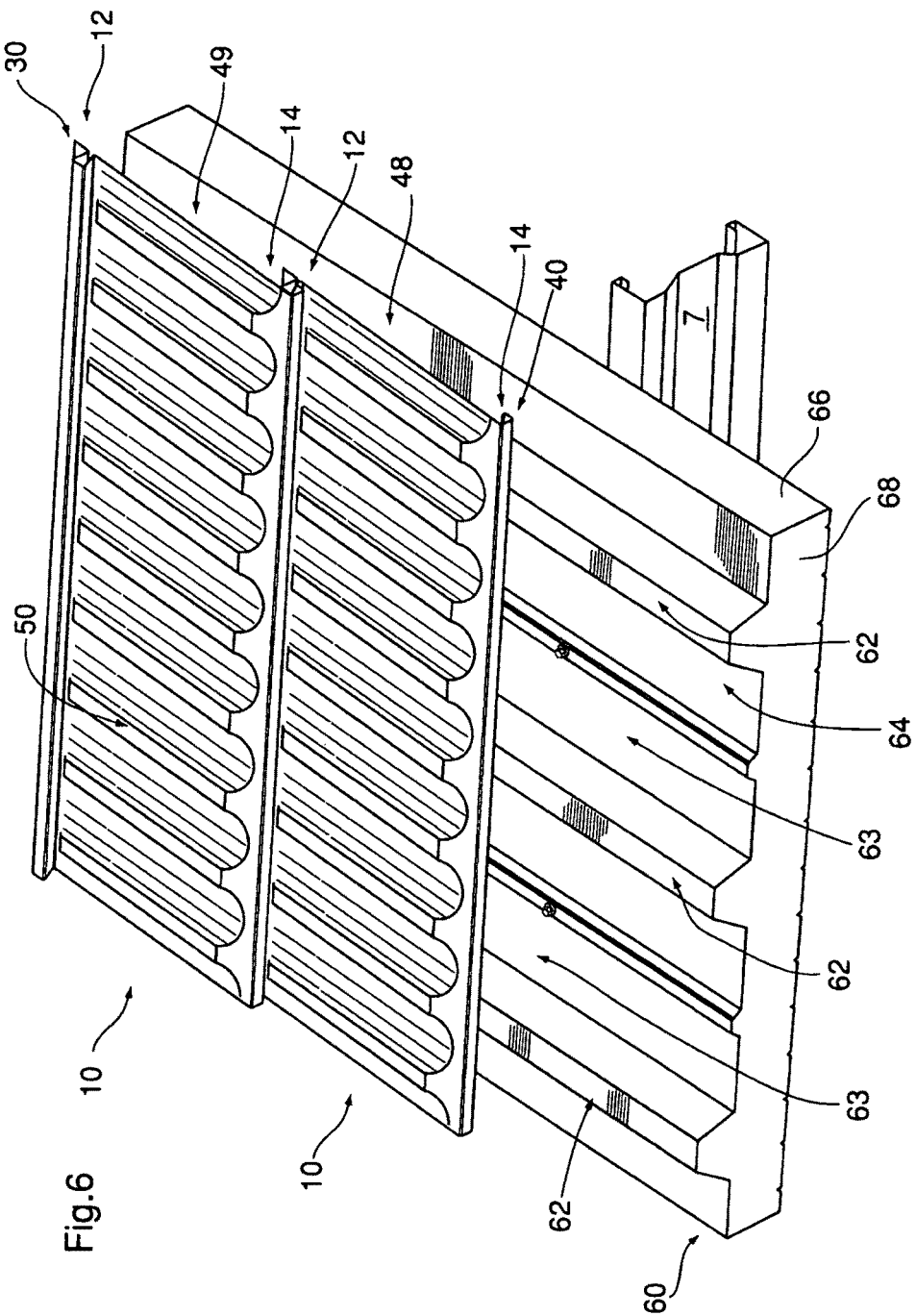

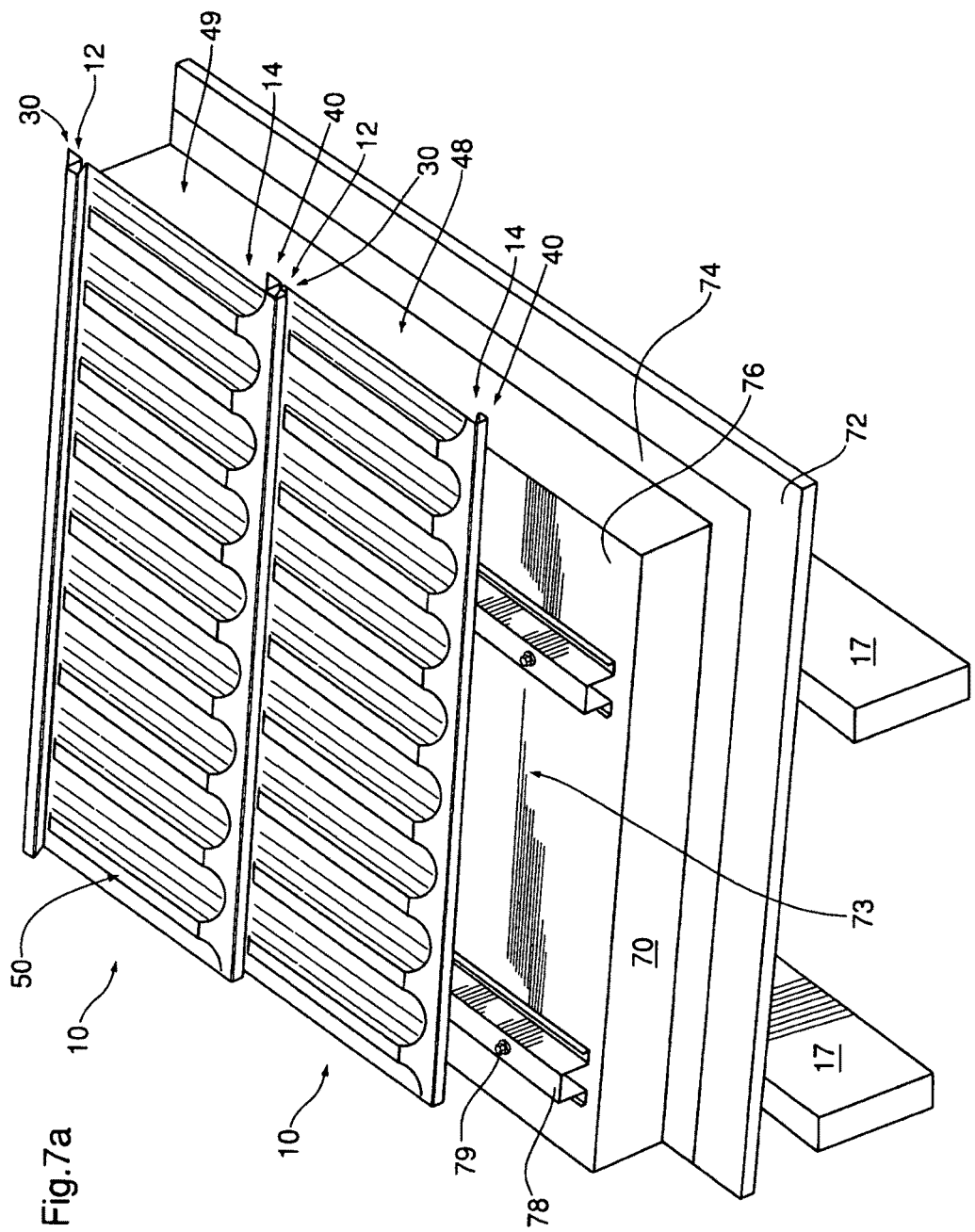

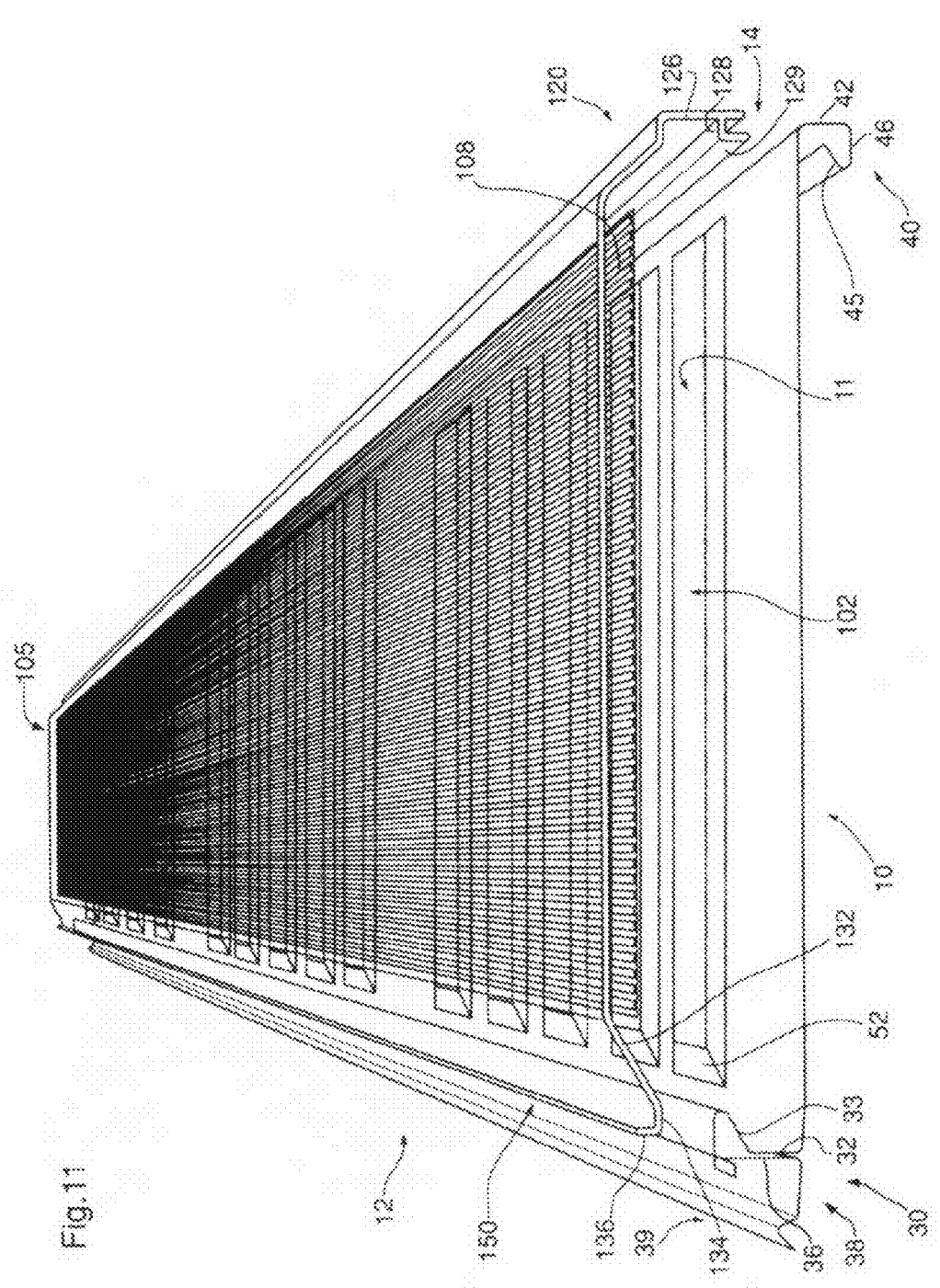

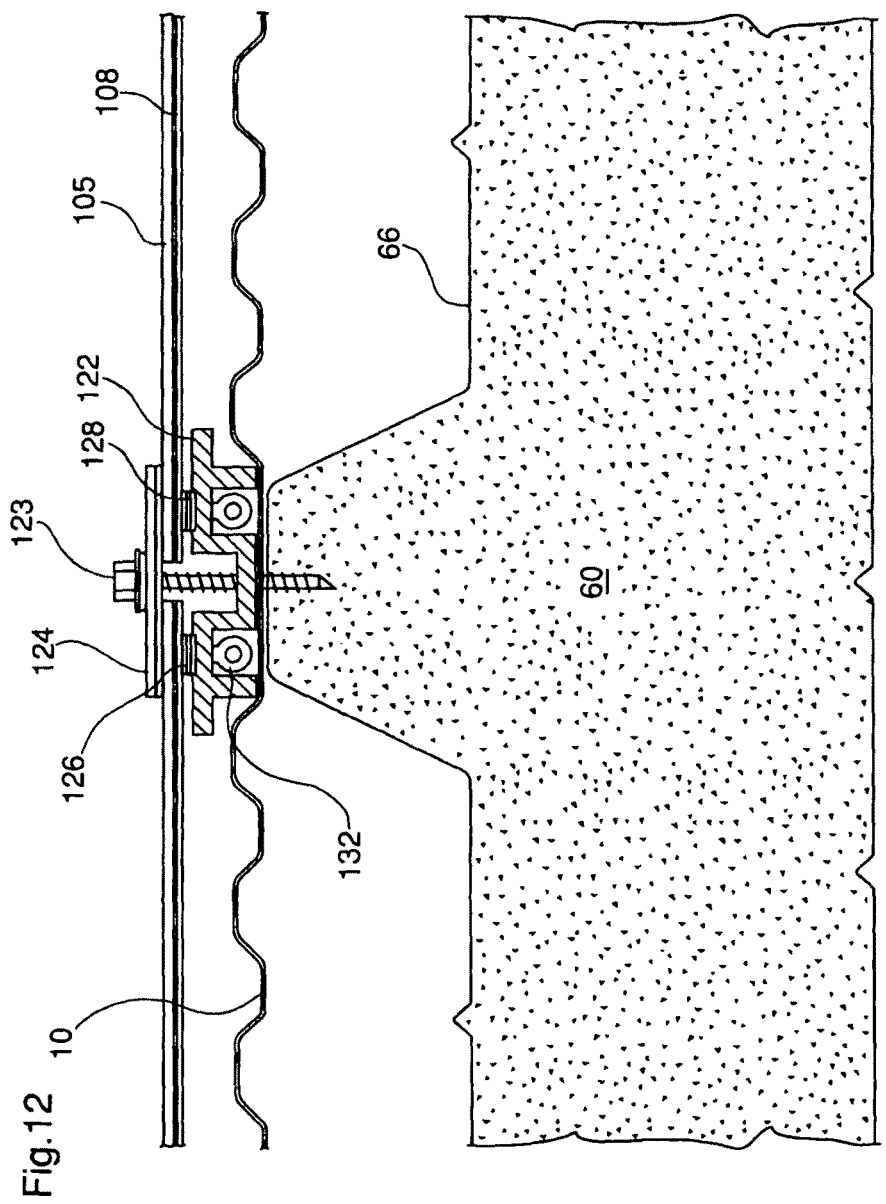

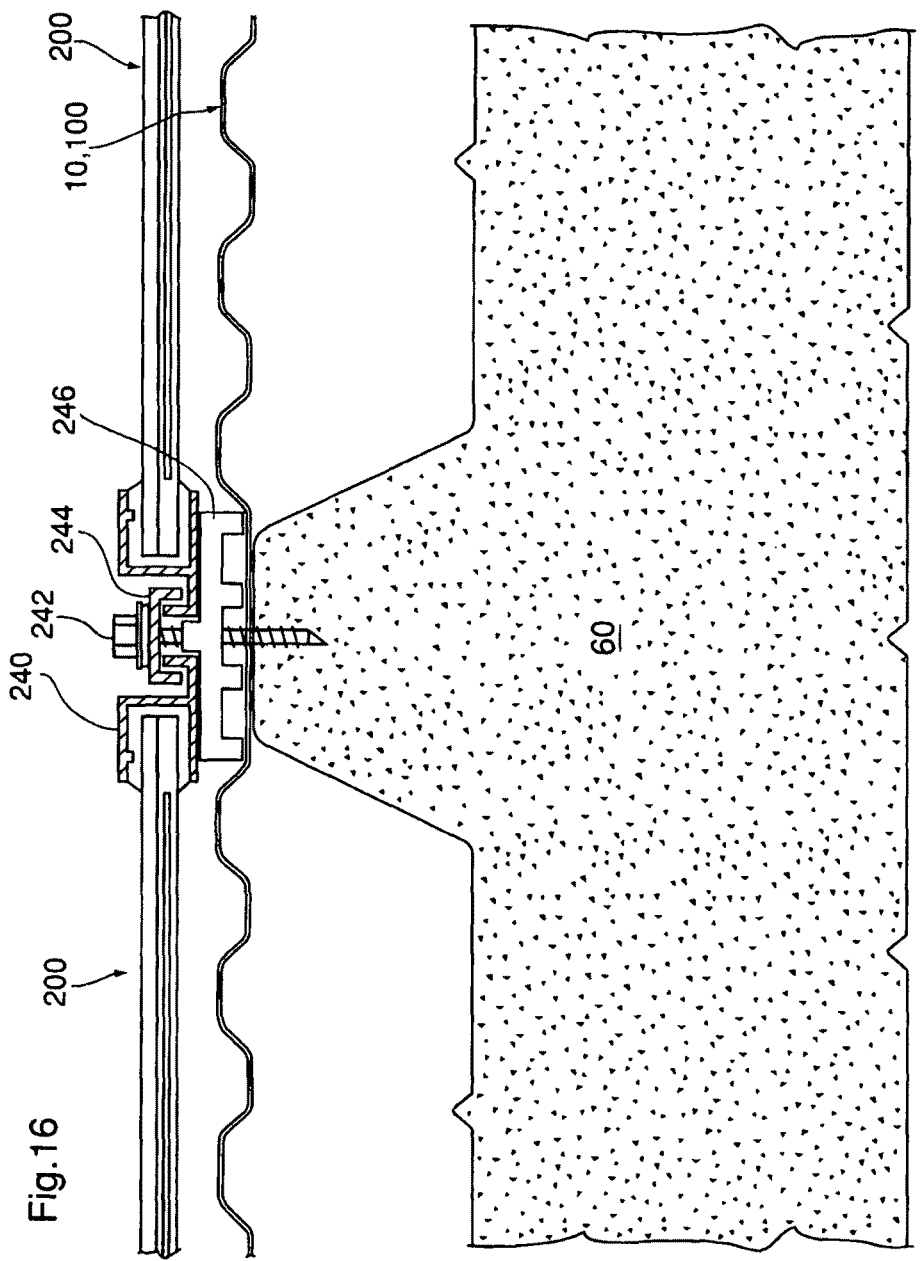

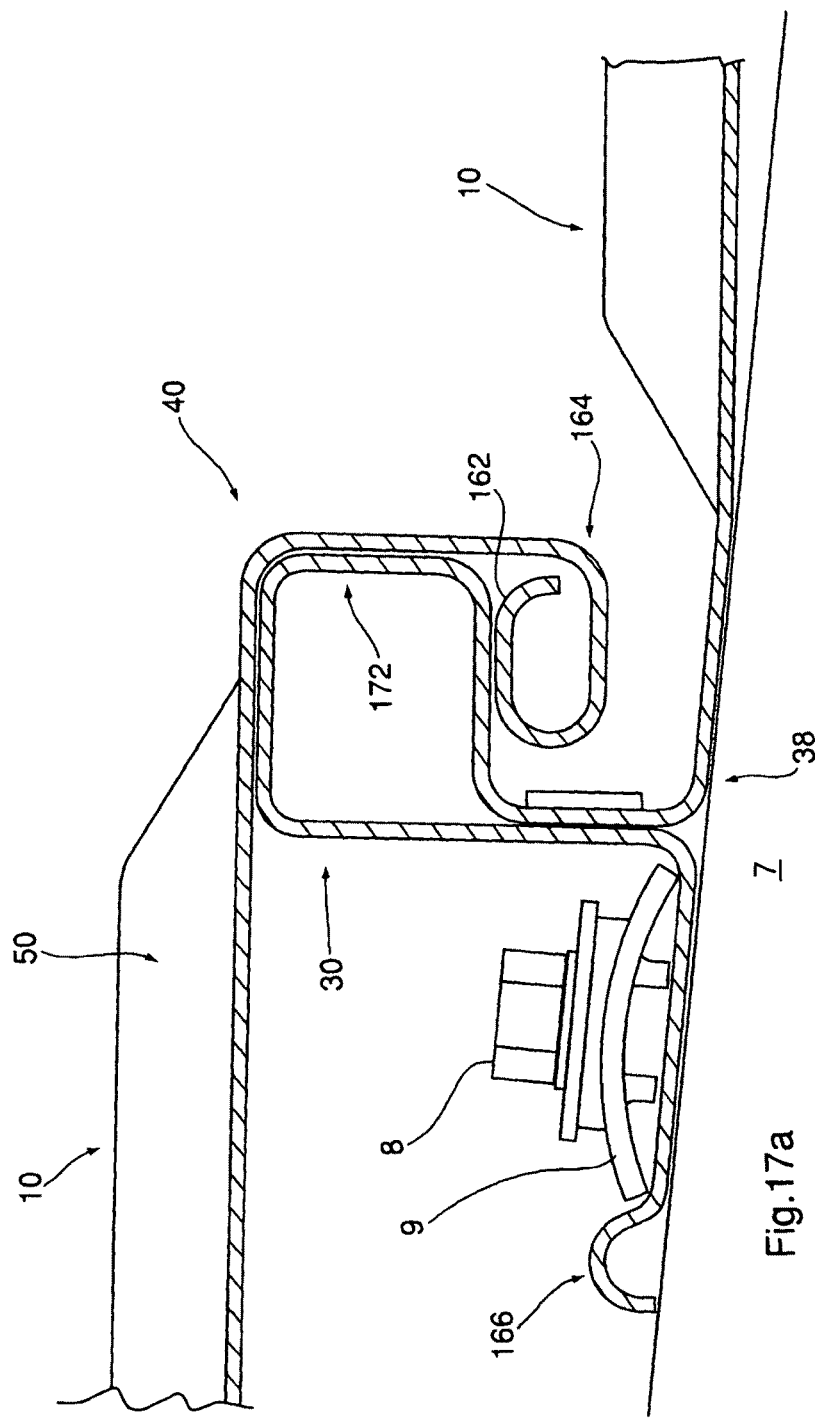

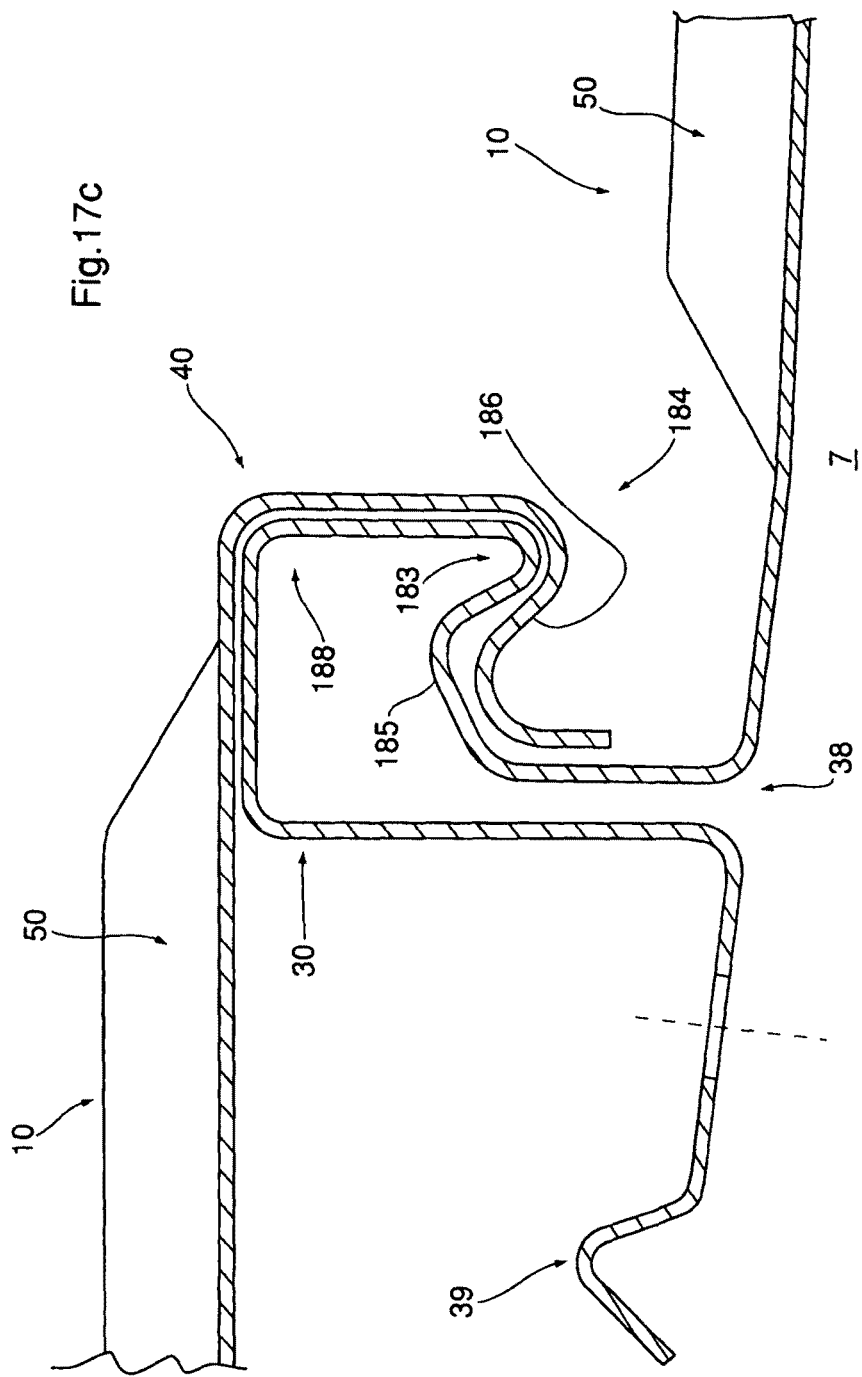

US 8,671,639 B2

ROOF PANEL FOR ROOFING SYSTEM AND ROOF STRUCTURE

CROSS REFERENCE TO RELATED APPLICATIONS

This application is a U.S. National Stage Application of PCT International Application No. PCT/CA2008/000875, titled "Roof Panel for Roofing System and Roof Structure", filed May 8, 2008, which in turn claims the benefit of U.S. Provisional Application No. 60/928,073, filed May 8, 2007. The entire disclosures of PCT International Application No. PCT/US2008/000875 and U.S. Provisional Application No. 60/928,073 are hereby incorporated by reference herein.

FIELD OF THE INVENTION

The invention relates to roof systems comprised of inter-fitting roof panels. In particular the invention relates to roof systems that provide a weatherproof inter-fit of roof panels. In some embodiments the invention relates to a roof system that provides for the transport or collection of air heated by the roof panels. In other embodiments the invention relates to a roof system for supporting solar collectors.

BACKGROUND OF THE INVENTION

A roof today is generally comprised of a number of components, most supplied and installed by different contractors. In residential construction insulation is often placed within an attic space situated below the roof. In winter water vapour, rising up from the living area below, can dampen the insulation and reduce its effectiveness. In summer the attic space absorbs solar heat from the roof and becomes a 'hot box' radiating heat to the living areas below and placing additional demand on the house cooling system. It is known that in many cases inefficient roof construction accounts for a large proportion of a building's energy losses.

In some cases, roofing is provided that includes metal panels affixed to a sub-roof or to an insulation layer on a subroof. However, such metal panels can be difficult to install and typically require support across their width. Further, the thermal properties of such metal panels can be significantly affected by the exposure of the surface of the metal panels to wind.

Roofs are now often installed with, or retrofitted to support, solar collection panels. Where a solar collection installation is installed on a roof, the collectors typically consist of heavy glazed glass panels contained within fabricated metal framing. Additional metal framing is typically required to attach the panels to the roof. Depending upon the size of the installation the roof may require additional reinforcement at the point of connection of the solar collection installation.

There is a need for a roof panel and roofing system that is straightforward to construct. There is an additional need for a roof panel and roofing system that provides convenient support for installations on a roof, such as a solar collection installation. There is a further need for a roof panel and roofing system that combines the functions of structure, insulation and weatherproofing in a single panel. Further, there is a need to provide a means for preventing such metal panels from being exposed to wind.

BRIEF DESCRIPTION OF THE DRAWINGS

In drawings which illustrate by way of example only a preferred embodiment of the invention, FIG. 1 illustrates a roof and building structure.

FIG. 2 illustrates an embodiment of a roof panel.

FIG. 3 illustrates a section view of the embodiment of FIG. 2.

FIG. 4a is an isometric illustration of an embodiment of the inter-fit of two roof panels during assembly on a base.

FIG. 5 is a simplified side view illustration a method of assembling an embodiment of the roof panels on a base.

FIG. 6 is an isometric cut-away illustration of an embodiment showing roof panels assembled on an insulation panel.

FIG. 7a is an isometric cut-away illustration of an alternate embodiment showing roof panels assembled on an insulation panel.

FIG. 11 is an isometric assembly view of an embodiment of a panel, panel cover and photovoltaic membrane.

FIG. 12 is a side section view of an embodiment of a side edge connector joining the sides of two adjacent panel covers with photovoltaic membranes installed.

FIG. 16 is a side section view of an embodiment of a side edge connector joining the sides of two adjacent panel covers with solar collectors installed.

FIGS. 17a to 17c are side section views of embodiments of the inter-fit of two roof panels when assembled on a base.

DETAILED DESCRIPTION OF THE INVENTION

Figure 4A:
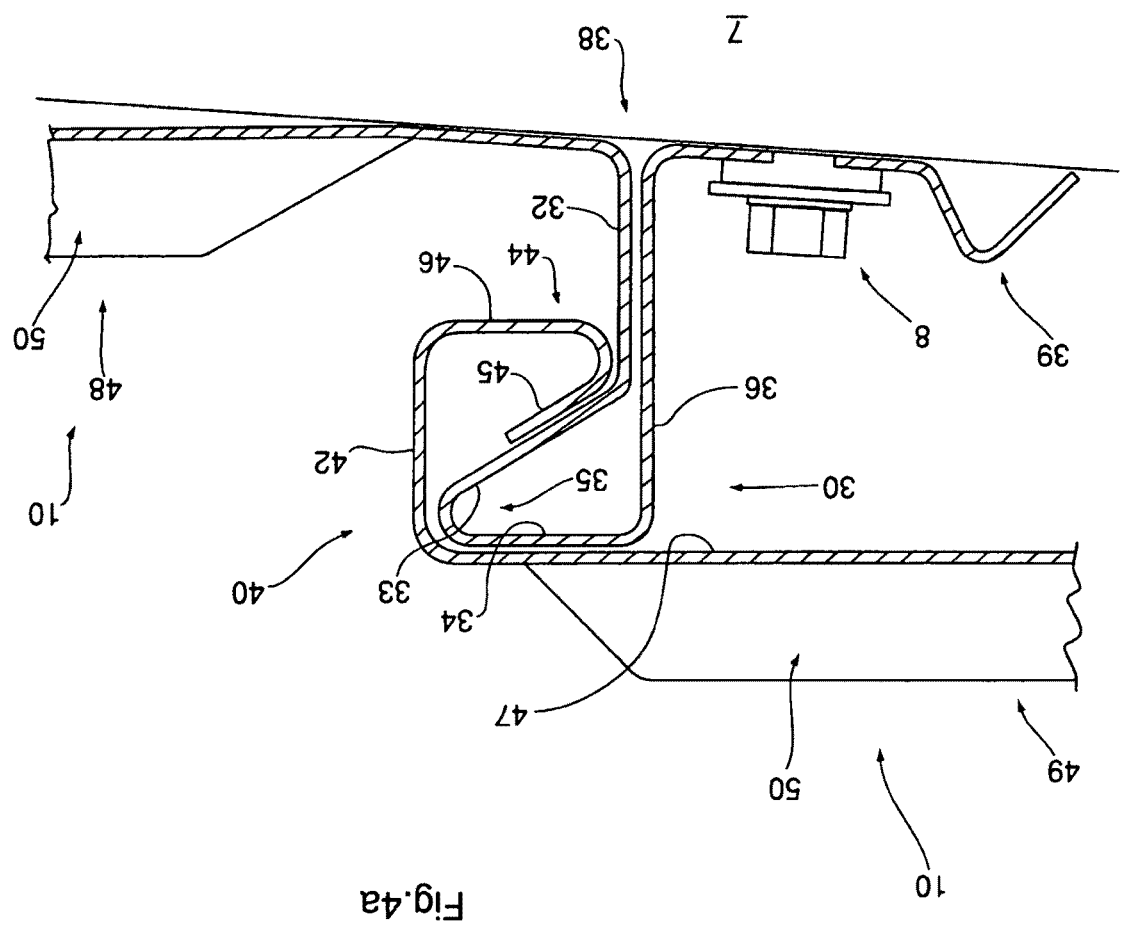
FIG. 4a illustrates a side section view of an embodiment of the inter-fit of two roof panels when assembled on a base.

A roof system comprising a plurality of like panels placed on the roof structure in an inter-fitting manner to form a roof covering. In an embodiment the panels may be adapted to perform as a large scale, low cost, flat plate thermal collector and as photovoltaic collectors for the generation of electrical energy. The system may be effectively employed on a variety of buildings including residential, commercial, institutional, agricultural and industrial.

In an embodiment there is provided a roof panel comprising a panel portion bounded along a support edge by a support edge section and along an opposed cover edge by a cover edge section; the support edge section and the cover edge section bent out of opposed edges of the panel portion; the support edge section adapted to provide resilient support and locking engagement with the cover edge section of an adjacent panel; and, the cover edge section adapted to rest upon and provide resilient sealing and locking engagement with the support edge section of a second adjacent panel.

In the embodiment, the support edge section may comprise a support element; the support element may comprise a support ledge resiliently supported at a first end by an upwardly standing wall, a second end of the support ledge defining a projection extending towards the panel portion from the upwardly standing wall, the second end of the support ledge resiliently supported by an angular portion of a second upwardly standing wall.

In an embodiment the cover edge section may also comprise a cover element and a lock element, the cover element adapted to rest on the support ledge and extend around the projection of the second adjacent panel when in locking engagement; the cover element comprising a portion of the panel proximate to the cover edge that rests upon the support ledge of the second adjacent panel and a depending leg extending from the portion of the panel below the projection of the second adjacent panel; the lock element adapted to locate a lock segment in resilient contact with the angular portion of the support element of the second adjacent panel when in locking engagement and, when in locking engagement the lock segment making planar contact with the angular portion, imparting a torque to the support element of the second adjacent panel in the direction of the support element of the panel.

Alternatively, in an embodiment, the cover edge section may comprise a cover element and a lock element, the cover element adapted to rest on the support ledge and extend around the projection of the second adjacent panel when in locking engagement; the lock element adapted to locate a lock segment in resilient contact with the angular portion of the support element of the second adjacent panel when in locking engagement; and, the lock segment extends upwardly over the ledge towards the depending leg.

In an embodiment the support edge section may comprise a stiffening section for supporting the panel, the stiffening section comprising a rib extending the width of the panel. In an embodiment the stiffening section is adapted to support the adjacent panel across the width of the panel when in locking engagement. In an embodiment the stiffening section is located at a distal end of the support edge section.

In another embodiment the support edge section may comprise a support element for supporting the cover edge section of an adjacent panel, and a distal flange adapted for receiving fasteners for securing the panel to a roof structure. In a preferred arrangement the distal flange receives fasteners in a location distal to the support element from the panel portion so as to be positioned under the cover edge section of an adjacent panel. Such an arrangement provides weatherproof shielding of the fastener and a fastener hole through the flange.

In an embodiment a roof panel system is provided, the roof panel system comprising: a panel portion bounded along a support edge by a support edge section and along an opposed cover edge by a cover edge section; the cover edge section adapted to rest upon and provide resilient sealing and locking engagement with the support edge section of an adjacent panel; the support edge section adapted to provide resilient support and locking engagement with the cover edge section of a second adjacent panel; a transparent panel cover for shielding an upper surface of the panel portion and adapted to inter-fit and lock with engaged support edge section and cover edge section pairs across the width of the panel when the panel is engaged with the adjacent panel and the second adjacent panel.

In an embodiment the panel cover may define a volume of trapped air above the upper surface of the panel portion when the panel cover is inter-fitted and locked in place. The panel cover may further comprise a photovoltaic membrane affixed to a bottom surface of the cover panel so as to be positioned between the panel cover and the upper surface of the panel portion.

In an embodiment the roof panel system may further comprise side joints for sealing opposed side edges of the panel covers; the side joints comprising conductive connectors for distributing power generated by the membrane.

In an embodiment of the roof panel system an edge section of the panel cover may comprise a panel cover support element and an opposed edge section of the panel cover may comprise a panel cover lock element; the panel cover support element adapted to engage with the panel cover lock element of an adjacent panel cover; and, the panel cover lock element adapted to engage with the panel cover support element of a second adjacent panel cover.

In an embodiment of the roof panel system an edge section of the panel cover may comprise a panel cover support element and an opposed edge section of the panel cover may comprise a panel cover lock element; the panel cover support element adapted to extend along a support edge section of the panel and terminated by an upstanding leg portion; the panel cover lock element adapted to extend around a cover edge section of the panel and terminated by a depending leg and a lock tab.

In an embodiment a roof panel system is provided, the roof panel system comprising: a plurality of inter-fitting roof panels consisting of a panel portion bounded along a support edge by a support edge section and along an opposed cover edge by a cover edge section; the support edge section and the cover edge section bent out of opposed edges of the panel portion; the support edge section adapted to provide resilient support and locking engagement with the cover edge section of an adjacent panel; the cover edge section adapted to rest upon and provide resilient sealing and locking engagement with the support edge section of a second adjacent panel; and, supports for supporting the panels above an air gap located between the panels and a base.

In an embodiment the supports may comprise one or more insulation panels for fixing to the base, the insulation panels adapted to support the panels above air gaps formed by contours in the panels. Alternatively, the supports may comprise a frame adapted to support the panels above the base.

In an embodiment a sloped roof structure is provided, the sloped roof structure comprising: a plurality of rafters supporting a layer of insulation; a plurality of inter-fitting roof panels supported above the layer of insulation; one or more air passageways formed between the plurality of inter-fitting roof panels and the layer of insulation; the one or more air passageways each supplied by outside air from an eaves of the roof structure; the one or more air passageways each connected at a ridge of the roof to an insulated chamber; and, the insulated chamber adapted to connect the air passageways to a thermal collector for use in the building.

In an embodiment the plurality of inter-fitting roof panels may each consist of a panel portion bounded along a support edge by a support edge section and along an opposed cover edge by a cover edge section; the support edge section and the cover edge section bent out of opposed edges of the panel portion; the support edge section adapted to provide resilient support and locking engagement with the cover edge section of an adjacent panel; the cover edge section adapted to rest upon and provide resilient sealing and locking engagement with the support edge section of a second adjacent panel.

In an embodiment the roof structure may further comprise a transparent panel cover for at least one of the plurality of roof panels, the panel cover shielding an upper surface of the panel portion and adapted to inter-fit and lock with engaged support edge section and cover edge section pairs across the width of the panel when the panel is engaged with the adjacent panel and the second adjacent panel.

As illustrated in FIG. 1, the roof system provides a roof 5 that extends from roof ridge 2 to eaves 3. Roof 5 comprises a plurality of panels 10 that inter-fit with one another. A pair of adjacent panels 10 lock together at opposed upper edge section 12 and lower edge section 14 (as shown for representative panel 10 in FIG. 2) to provide mutual support and shielding of the joints between adjacent panels 10. The terms upper edge section 12 and lower edge section 14 are used for convenience and refer to the vertical disposition of the edges 12, 14 of the panel 10 as oriented in a typical installation on a sloped roof such as roof 5 shown for example in FIG. 1 (other terms used in this description will also reference the typical orientation and arrangement of panels 10 on a sloped roof such as roof 5). The representative panel 10 shown in FIG. 2 is rectangular and elongate and, as shown in FIG. 1, when installed a number of such panels 10 extend parallel to the roofs roof ridge 2 from which the underlying rafters (not shown) slope downwardly towards eaves 3.

As illustrated in FIGS. 2 to 4, panels 10 are intended to be installed such that the upper edge section 12 of one such panel 10 inter-fits with the lower edge section 14 of an upwardly adjacent panel (upper edge section 12 may be functionally described as support edge section and lower edge section 14 may be functionally described as a cover edge section). Also as illustrated in FIGS. 2 to 4, the upper edge section 12 of a panel 10 includes a support element 30 for supporting the lower edge section 14 of an adjacent inter-fitting panel 10, when in position. Lower edge section 14 also includes a cover element 40 that inter-fits with and locks to the support element 30 of an adjacent inter-fitting panel 10 to provide locking engagement between the panels 10.

The support element 30 is preferably adapted to support panel 10 across the length of the support edge, spanning across the gap between the underlying rafters or trusses in the roof structure. In an embodiment the panels 10 may be fixed directly to the purlins or roof panels that span between rafters in the roof structure. In a preferred embodiment the support element 30 may be fixed directly to the underlying rafter and the purlins or roof panels that would otherwise be used to support the roof covering may be dispensed with. In the preferred embodiment the support element 30 is sufficiently rigid to support the panel 10 across the gap between adjacent underlying rafters without additional supports. Preferably the support element 30 is also sufficiently rigid to support the cover element 40 of an adjacent panel 10 across the gap without additional reinforcement.

Referring to FIGS. 2 and 3, each panel 10 may be integrally formed from a single sheet of material, such as sheet metal or plastic. The upper edge section 12 comprises a support element 30 that is formed from the same sheet of material as the body or panel portion of the panel 10. The lower edge section 14 comprises a cover element 40 that may likewise be formed into the same sheet of material as the body of the panel 10. This uniform construction assists in providing a weatherproof roof panel 10.

Ribs 50 are shown in FIGS. 2 and 3 and may likewise be integrally formed in panel 10. Preferably ribs 50 extend substantially between support element 30 and cover element 40 to provide stiffness and assist in transmitting load from the body of the panel 10 to upper edge section 12 and lower edge section 14 of the panel 10. As is described below in further detail, each of opposed side edges 16, 18 of a panel 10 is able to provide inter-fitting engagement with an appropriate side edge of a laterally adjacent similar panel 10.

Referring to FIG. 3, a cross-section view taken along A-A in FIG. 2, (and as may be seen in FIGS. 2 and 4) support element 30 projects generally upwardly from the plane of the panel 10. As is shown in FIG. 3, support element 30 is formed in the upper edge section 12 of the panel 10. In the embodiment shown in FIG. 3, support element 30 is formed to include a somewhat P-shaped projection 35 with the loop of the P facing the panel portion of the panel 10. As is shown in FIG. 2, support element 30 extends from side 16 to opposing side 18 of panel 10. Preferably as illustrated the P-shaped projection 35 comprises a double-walled hollow structure that provides resilient support to an inter-fitting cover element edge section 40.

The specific embodiment of support element 30 shown in FIG. 3 includes two upwardly standing walls 32, 36 which, in the embodiment illustrated, are substantially perpendicular to the plane of panel 10. Wall 32 is on the medial side of wall 36 relative to the center of the panel 10 and is shorter than wall 36. Wall 36 terminates at an end of support ledge 34 that extends towards lower edge section 14 and which is substantially parallel to the plane of panel 10. The other end of support ledge 34 defines the projection 35 that extends from wall 32. An angular portion 33 extends away from the end of wall 32 and ends at or near the end of support ledge 34 nearest lower edge section 14 to complete the projection 35 of the embodiment of FIG. 3. Support ledge 34 is intended to be in contact with the underside of an upper, adjacent panel 10, when installed. The projection 35 is intended to provide a locking means for securing the cover element of an adjacent panel 10. Support element 30 thus provides support and, as described in more detail below, a means for the interfitting of upper, adjacent panel 10.

Panel 10 as shown in FIG. 3 includes a flange element 38 located in upper edge section 12 and upwardly of support element 30. Flange element 38 extends from side 16 to opposing side 18 of panel 10. The flange is used to secure panel 10 to a structural deck or to roofing framing, as is described below. In an embodiment holes may be punched through flange element 38 to accommodate self-drilling screws to secure the panel 10 to the structural deck or framing. Stiffening section 39, shown in FIG. 3, extends from side 16 to opposing side 18 and is incorporated into flange element 38 to provide additional support and stiffening for panel 10. Stiffening section 39 may be formed, for instance by bending the sheet of material to produce a rib in the flange element 38 that extends generally from side 16 to opposing side 18. In the embodiment illustrated in FIG. 3 the stiffening section 39 is located an edge of the flange element 38, though it could be located at other portions of the flange element 38.

Panel 10 as shown in FIGS. 2 and 3 includes cover element 40 that extends from side 16 to opposing side 18 at lower edge section 14 of panel 10. Cover element 40 is shaped to inter-fit with the projection 35 of support element 30. The cover element 40 may be described as having a cover element and a lock element. The cover element provides weather proof shielding of the joint between adjacent panels 10. The lock element locates a lock element in resilient contact with an underside of the projection 35 of an adjacent panel 10.

In the embodiment of FIGS. 2 and 3 the underside of the projection 35 comprises the angular portion 33 that joins the top of wall 36 with the end of the support ledge 34. As illustrated in FIG. 3, cover element 40 has a depending wall 42 that is generally perpendicular to the plane of panel 10 and which terminates at ledge 46. Generally the cover element may be considered to comprise the upper surface of the cover element, depending wall 42 and the ledge 46. Depending wall 42 is shorter than the height of wall 36 in support member 30 and terminates at lock segment 45. Generally the lock element may be considered to comprise the ledge 46 and the lock segment 45. It is understood, however, that the action of the lock element depends upon its connection to and support through the cover element to the panel portion of the panel 10.

Referring to FIGS. 4 and 5, the inter-fitting engagement of two adjacent panels 10 is illustrated. FIG. 4 shows the detail of the inter-fitting of a support element 30 with a cover element 40. FIG. 5 shows the inter-fitting of a set of panels 10 and illustrates how a panel is installed using the inter-fitting feature of upper edge section 12 and lower edge section 14.

FIG. 4a depicts upper edge section 12 of a first panel 48 (one of panels 10, described above). First panel 48 is shown secured, by a series of screws 8, to a base 7 (in the cross-section of FIG. 4 only one such screw 8 is shown). Base 7 could be a rafter, roof panel or other underlying support member (as is shown in more detail in the examples of FIGS. 7 and 8). Screws 8 are located in flange element 38, between support element 30 and stiffening section 39. FIG. 4a also shows lower edge section 14 of a second panel 49 (similarly one of panels 10, described above). Second panel 49 is secured on a base 7 of a sloped roof (screws 8 are not shown for second panel 49 as only the lower edge section 14 is depicted in FIG. 4a). In FIG. 4a, first panel 48 is arranged below second panel 49 on a sloped roof, such as that shown in FIG. 1.

FIG. 4a shows the inter-fitting of support element 30 of first panel 48 with cover element 40 of second panel 49. The bottom surface 47 of second panel 49 is resting upon and supported by support ledge 34 of the support element 30. Lock element 44 is in contact with the projection 35 to provide engagement. As illustrated, when assembled as shown in FIG. 4 the bottom face 47 of second panel 49 is supported by support element 30 of lower adjacent panel 48. Further, cover element 40 of second panel 49 substantially conceals support element 30 and in co-operation with support element 30, shields the joint between the two panels 48,49. Lock element 44 locates at least a portion of lock segment 45 in tight resilient engagement along the angular portion 33 of the underside of projection 35 to prevent movement of the upper panel 10 when the support element 30 of the first panel 48 is subsequently secured to base 7 by a screw 8 through its flange element 38.

As can be seen from FIG. 4a and the above description, the shapes of support element 30 and of cover element 40 provide for support and locking of panels 10, as well as the covering or sealing of the connections between the panels 10 when installed. Importantly, the screws 8 are located at the distal portion of the support element 30 such that the cover element 40 shields the screws 8 providing weatherproof fixation of the panels 10 to the base 7.

Figure 4B:
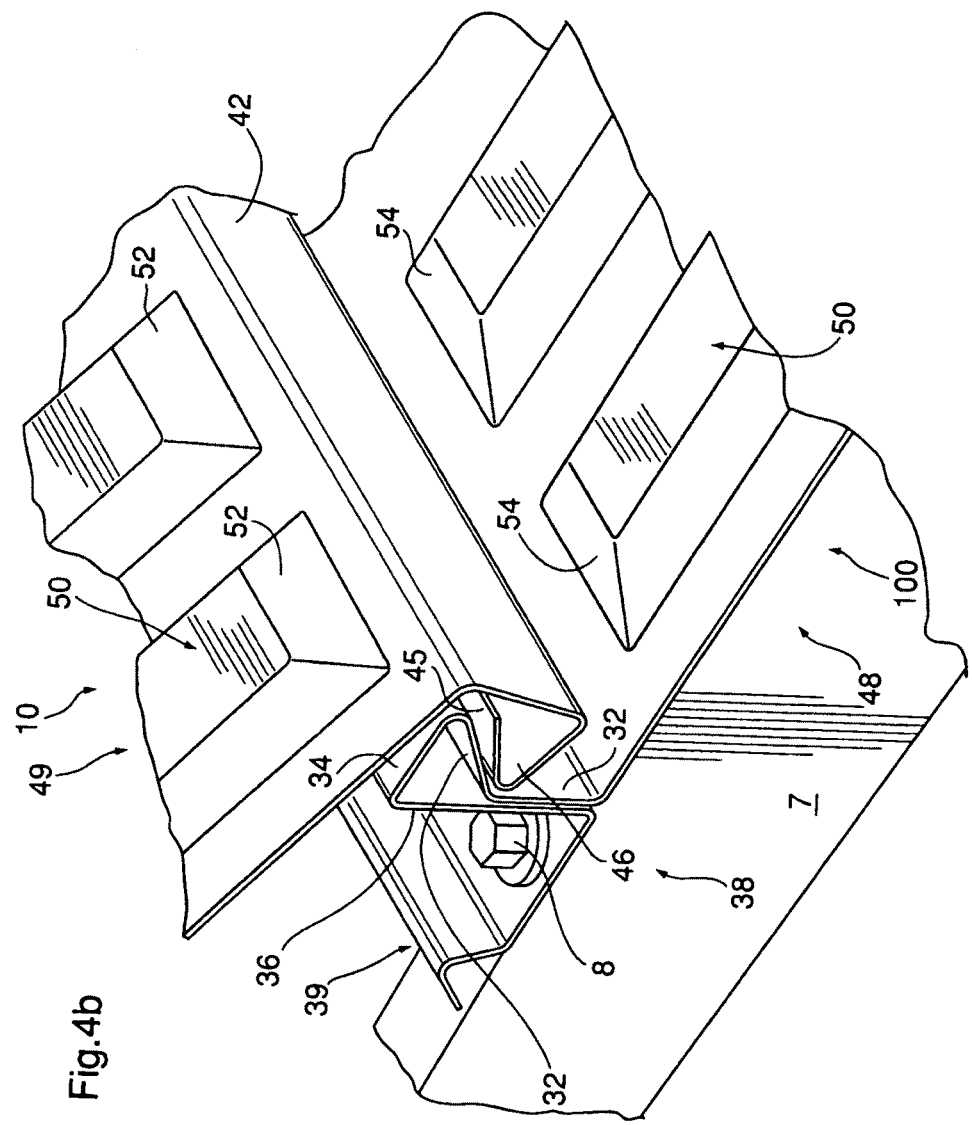

FIG. 4b is an isometric view of the second panel 49 and first panel 48 during the process of linter-fitting the second panel 49 in engagement with first panel 48. As illustrated in FIG. 4b, the first panel 48 is secured to a base 7. The second panel 49 is oriented at an angle to the first panel 48 with the cover element of the second panel 49 located below the support element 30 of the first panel 48.

FIG. 5 is a simplified section view illustrating the inter-fitting engagement of adjacent panels 10 when being installed on a base 7. As illustrated the cover element 40 of the first panel 48 may be supported on a terminal support element 61 as could be used at the eaves 3 of the roof 5. The support element 30 of the first panel 48 is fixed to the base 7 by means of a series of screws 8 (only one shown in the section view). A second panel 49 is illustrated in relation to the first panel 48 prior to fixing the support element 30 of the second panel 49 to the base 7. As illustrated the cover element 40 of the second panel 49 is hooked around the support element 30 of the first panel 48. Second panel 49 may be rotated about the support element 30 of the first panel 48 until the flange element 38 of the second panel 49 is in contact with the base 7. Preferably the cover element 40 of the second panel 49 applies a slight torque to the support element 30 of the first panel 48 when the flange element 38 of the second panel 49 is in contact with the base 7. In the preferred arrangement the support element 30 provides support to the cover element 40 such that the torque provides for a resilient weatherproof inter-locking fit between the lock element 45 and the angular portion 33. It will be appreciated that FIG. 5 is a simplified illustration intended to illustrate the engagement and is not intended to be a scale drawing of the actual size or range of motion between components.

The above described panel construction avoids the necessity not only to provide separate purlin elements in the roof support but also to fix the panels 10 along both the upper edge section 12 and the lower edge section 14 with a single series of fasteners 8 since the lower edge sections 14 are restrained by the above mentioned interlocking engagement with the adjacent panel's support element 30. Assembly of the roofing system is thus relatively rapidly and simply achieved by locating a lower edge section 14 of an upper panel 10 about the support element 30 of a first panel 48, dropping the upper panel 10 into place and fixing the flange element 38 of the second panel 49 to the base 7 (supporting deck or rafters). Fasteners, such as screws 8, through holes in the distal portion of support element 30 are located to be positioned under the cover element 40 of an adjacent inter-fitting panel 10.

The opposed side edges 16, 18 provide a weather proof sealing engagement with neighbouring panels 10 when the support element 30 of one panel 10 is fixed in place alongside previously fixed panels 10. Preferably the panels 10 are provided with a side edge 16 that is intended to rest atop a neighbouring panel 10 and a side edge 18 adapted to rest below a neighbouring panel 10. Accordingly, a roof system may be assembled by installing along the edge of the roof 5 where the side edge 16 is intended to rest atop any neighbouring panel 10 and subsequent columns of panels may be installed across the roof to locate newly placed panels 10 atop the side edge 18 of a previously fixed column of panels 10. The manner of inter-fitting engagement of the support elements 30 and cover elements 40 provides for sealing engagement of the side edges 16, 18 in a single installation action, preferably applying a contact force between the side edges 16, 18 of adjacent panels 10. Additional sealing may be provided by including a sealant or adhesive along and between the side edges 16, 18.

In an embodiment insulation may be incorporated with the installation of the roofing panels 10 to provide an insulated space below the roof 5. Referring to FIGS. 6 and 7 two embodiments of insulation are illustrated.

In FIG. 6 the panels 10 are fixed to an insulated panel 60. In the embodiment illustrated in FIG. 6 the insulated panel 60 comprises a plurality of ridges 62 or valleys 64 to provide an air gap 63 below the panels 10. The air gap may be vented by providing openings into the air gap 63 at roof ridge 2 and eaves 3 to allow for the passage of air into the air gap 63 at the eaves 3 and out of the air gap 63 at the ridge 2.

The insulated panel 60 may comprise a composite structure such as a rigid skin 66 encapsulating an insulating core 68. In an embodiment the insulation panel 60 may comprise an insulated metal sandwich panel comprising a core 68 of, preferably, non-combustible insulation material sandwiched between a skin 66 consisting of a heavily profiled metal external weather sheet and an internal shallow profiled metal liner. The insulation may be bonded to the steel sheets during the manufacturing process to provide strong, rigid, panels with good thermal performance. The thickness of the insulation panels 60 may be varied to suit the degree of insulation required depending upon the thermal properties of the insulating core 68.

In an alternate embodiment the insulation panel 60 may comprise an insulating foam with a weather proof exterior. Preferably the foam may be dense enough to support and fixate the panels 10. Alternatively, the panels 10 may be fixed directly to the underlying base 7 through the insulation panels 60 either with self-drilling screws or by the means of mounting hardware fixed to the base 7 through the insulation panels 60 to provide attachment points for attaching the panels 10.

In the embodiment illustrated in FIG. 6, upstanding ribs formed in the external metal sheet of the sandwich panels comprise the ridges 62 to provide an attachment point for the panels 10 and define the air gap 63 when the panels 10 are attached to the insulated panels 60 thus defining an eaves 3 to roof ridge 2 air passageway to be formed between the panel 10 and the insulated deck 60. Outside air introduced at the lowest point of the roof 5 is allowed to rise within this passageway to the highest point of the roof 5. Heat collected by this airflow from the sun warmed panels 10 may be deposited into an insulated hollow ridge component 6 for capture or alternatively exhausted to the atmosphere to moderate roof temperatures in hot conditions (see FIGS. 8 and 9).

In FIG. 7*a* the roof panels 10 are fixed to a flat insulated panel 70. The flat insulated panel 70 may comprise a composite structure, as described for the embodiment of FIG. 6, or alternatively may comprise a foam insulation panel.

In the embodiment of FIG. 7*a* a roof deck 72 is installed onto rafters 17. Pre-existing structures will typically have the roof deck 72 in place or alternatively a builder may choose to install a roof deck 72 for local building code requirements or convenience. To prevent the migration of water vapour through the deck 72 from the interior of the building, a moisture barrier 74 is installed over the deck 72. The flat insulated panel 70, preferably rigid, non-combustible, insulation of a thickness designed to give the required insulation value, is placed over the vapour retarder 74. A moisture barrier 76 is placed over the flat insulated panel 70 to provide an overall weatherproof membrane. Alternatively the insulated panel 70 may be provided with a weatherproof exterior to avoid requiring installation of separate water barriers 74, 76.

In the embodiment illustrated in FIG. 7*a* ridges formed by light metal 'top hat' elongate sections 78 running in a direction from the eaves 3 to the ridge 2 create an air gap 73 under the panels 10 above the insulated panel 70. Preferably the metal sections 78 and insulated panel 70 are fixed to the deck 72 with self-drilling screws 79. The panels 10 may be secured to the 'top hat' sections 78 with similar self-drilling screws. The positioning of the panels 10 over the 'top hat' sections 78 allows an air passageway 73 to be formed between the underside of the panels 10 and the water barrier 76 (if any) on the insulated panel 70.

Figure 7B:
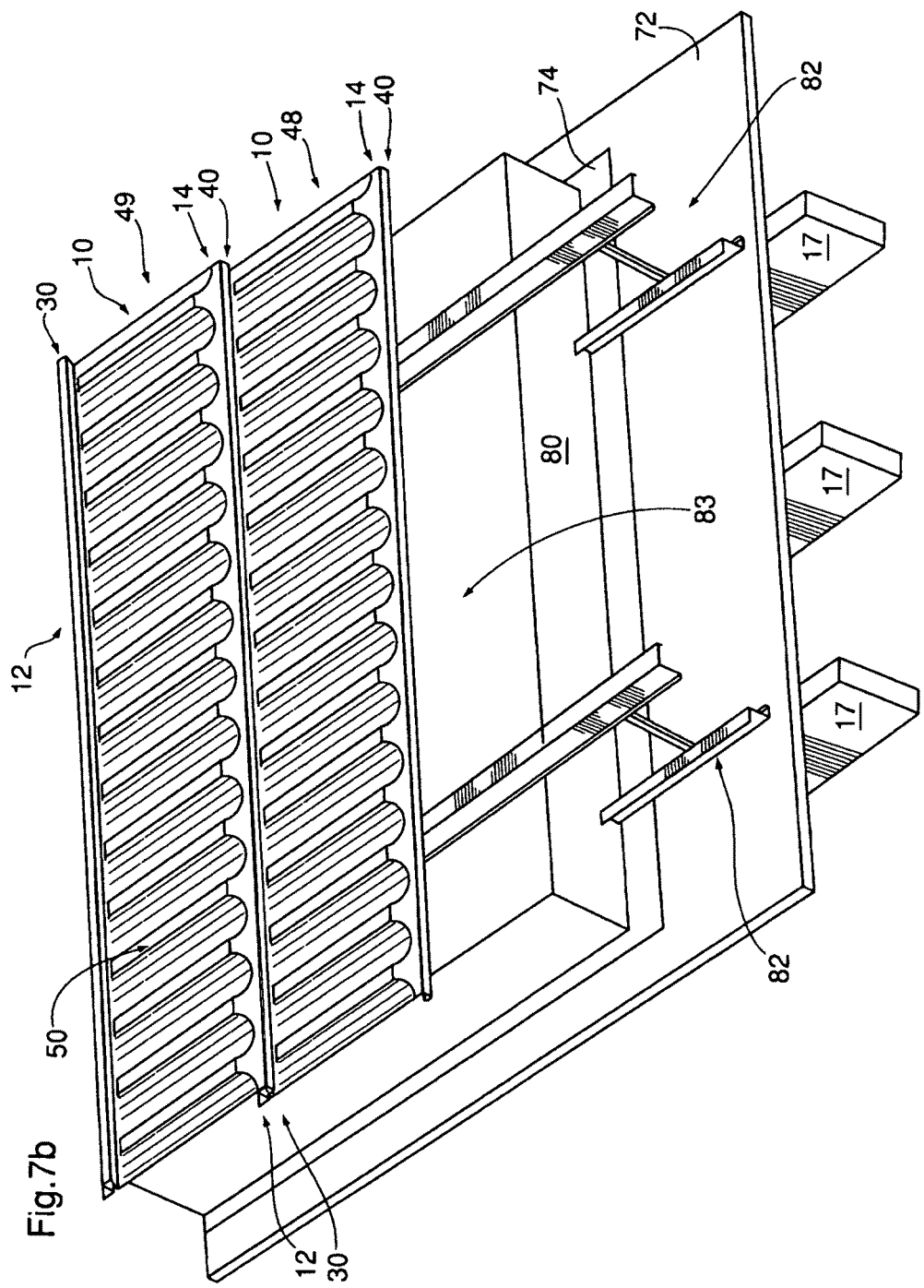
FIG. 7b is an isometric cut-away illustration of an alternate embodiment showing roof panels assembled on insulation.

FIG. 7*b* illustrates an alternate embodiment in which in situ installed insulation 80, such as blown liquid polyester or polystyrene foam, may be utilised. A frame 82 may be used to support the panels 10 above the roof deck 72. If necessary a vapour retarder 74 may be installed on the roof deck 72 and the frame 82 installed above the vapour retarder 74 and fixed directly to the roof deck 72. Once the frame 82 is in place, insulation may be installed by either placing insulating layers onto the roof deck 72 at the base of the frame 82, or blowing insulation 80 onto the roof deck 72 at the base of the frame 82.

Once the insulation has been built up to the desired level the panels 10 may be installed by fixing directly to the frame 82, creating an air gap 83 between the insulation 80 and the panels 10.

Figure 8:
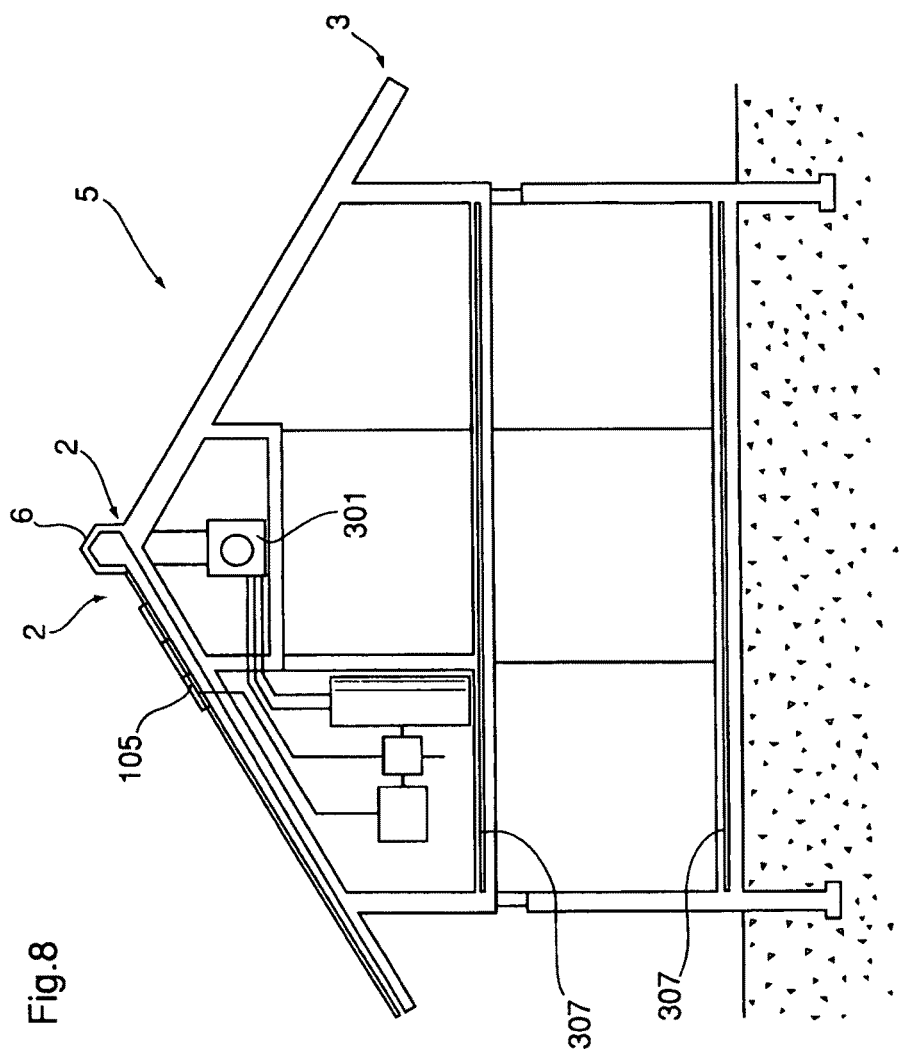
FIGS. 8 and 9 are side section views of an embodiment of a building structure employing an embodiment of the roof system.

As described above air heated in the air gap 63, 73 may be exhausted to the atmosphere to cool the roof 5, or alternatively may be used to collect heat for use in the building. Referring to FIG. 8, in one embodiment heat may be collected from the roof in insulated duct 6. The heat may then be moved from the insulated duct 6 to an air/water heat pump 301. Hot air provided by the roof 5 is directed to the heat pump 301 to provide hot water for domestic uses and for an in-floor heating system.

Figure 9:
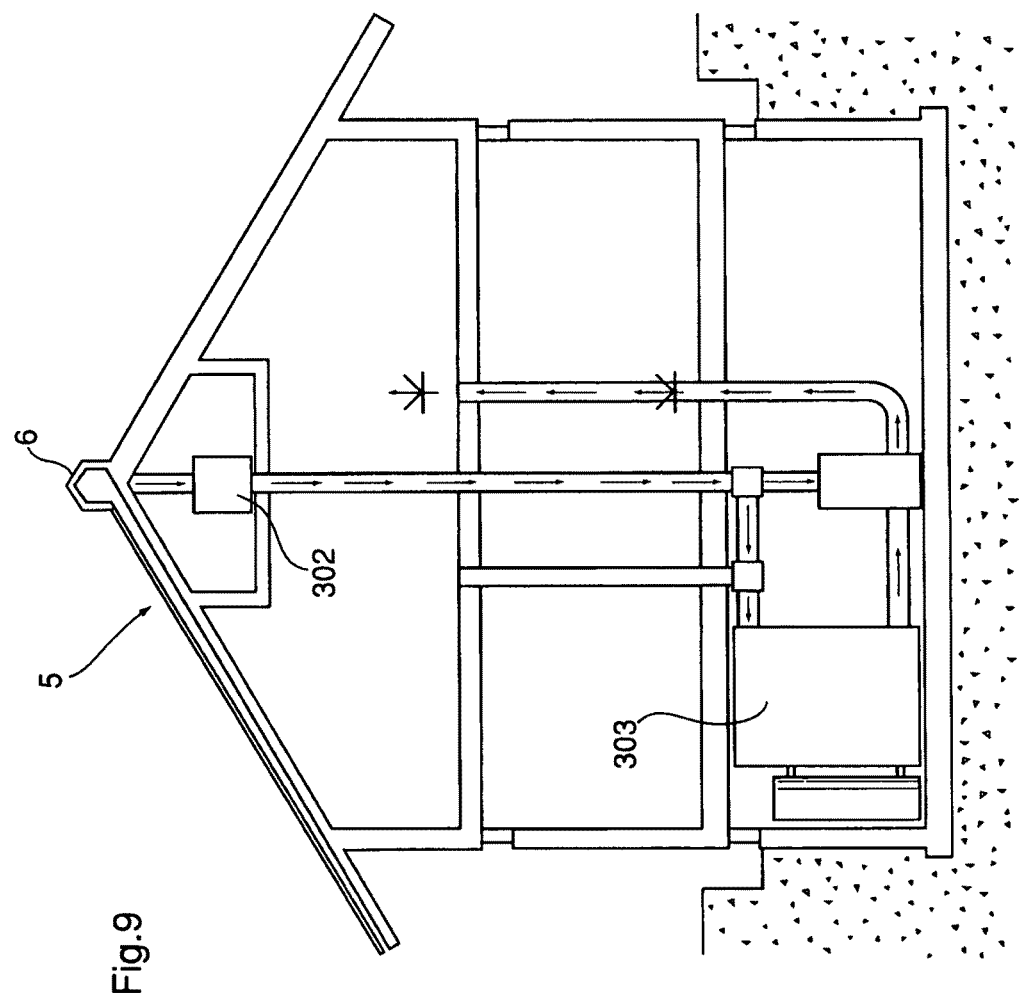

FIG. 9 illustrates an arrangement where solar heated air is drawn from the preferably insulated duct 6 in the roof 5 by an air mover 302 and ducted to an insulated heat store 303 at the base of the house, adjacent to a conventional oil or natural gas furnace. The heat store 303 may comprise a highly insulated light metal box containing an efficient heat storage medium. Air passageways formed within the storage medium allow for the efficient deposit and extraction of the collected solar heat. The heat store 303 may be sized to meet the heating system demands of the building. Hot air may be drawn directly from the roof 5, for hot water and space heating purposes, at times when it is available. At night, heat may be drawn from the heat store 303 where it has accumulated during the day. At times when solar heat is not available, and the store 303 is unable to meet the demand, the furnace operates as auxiliary support.

In an alternate arrangement, heat collected in the insulated duct 6 may be directed to in-floor heating to supplement the operation of a furnace. By heating a floor with (relatively) high thermal mass, a house may be passively heated in the day and retained heat stored in the floor may passively assist in maintaining the heat at night.

By employing dampered openings the interior of the building may be ventilated when the roof 5 is heated by the sun. In an embodiment a damper at the eaves 3 of the air gap 63, 73 may allow air to be drawn from inside the building as the air gap 63, 73 is heated by the sun. In such a fashion passive ventilation of the building may be provided as the sun heats the panels 10. In an embodiment dampers may be provided between the interior of the building and the air gap 63, 73 at the ridge 2 to allow air heated by the air gap 63, 73 to be vented into the building. The pre-heated air may either be provided directly to the interior of the building, passed through a heat exchanger to capture heat from exhaust air, or directed to a heat pump or furnace to be heated to a desired temperature.

In an embodiment, dampers may be provided between the interior of the building and the air gap 63, 73 at the ridge 2 and the eaves 3 to allow air to be drawn from inside the building, heated in the air gap 63, 73 and be returned to the building as heated air. A thermostat may be provided to control operation of the dampers to ensure the heated air is sufficiently warm to be used as heated air. In an embodiment a fan may be used in conjunction with the thermostat to control the flow of air to ensure adequate heating of the air.

The system described above may be used to supplement a conventional heating system to provide heat as available reducing the amount of energy expended by the heating system.

In normal circumstances the heat collection performance of the panels 10 is limited. As the panels 10 absorb solar energy they also dissipate heat to the atmosphere. Cooling of the panels 10 is increased by the action of wind against the panels 10. Where used as a thermal collector, the panels 10 preferably have a dark outer surface (most preferably black) for optimal thermal collection properties.

Figure 10A:
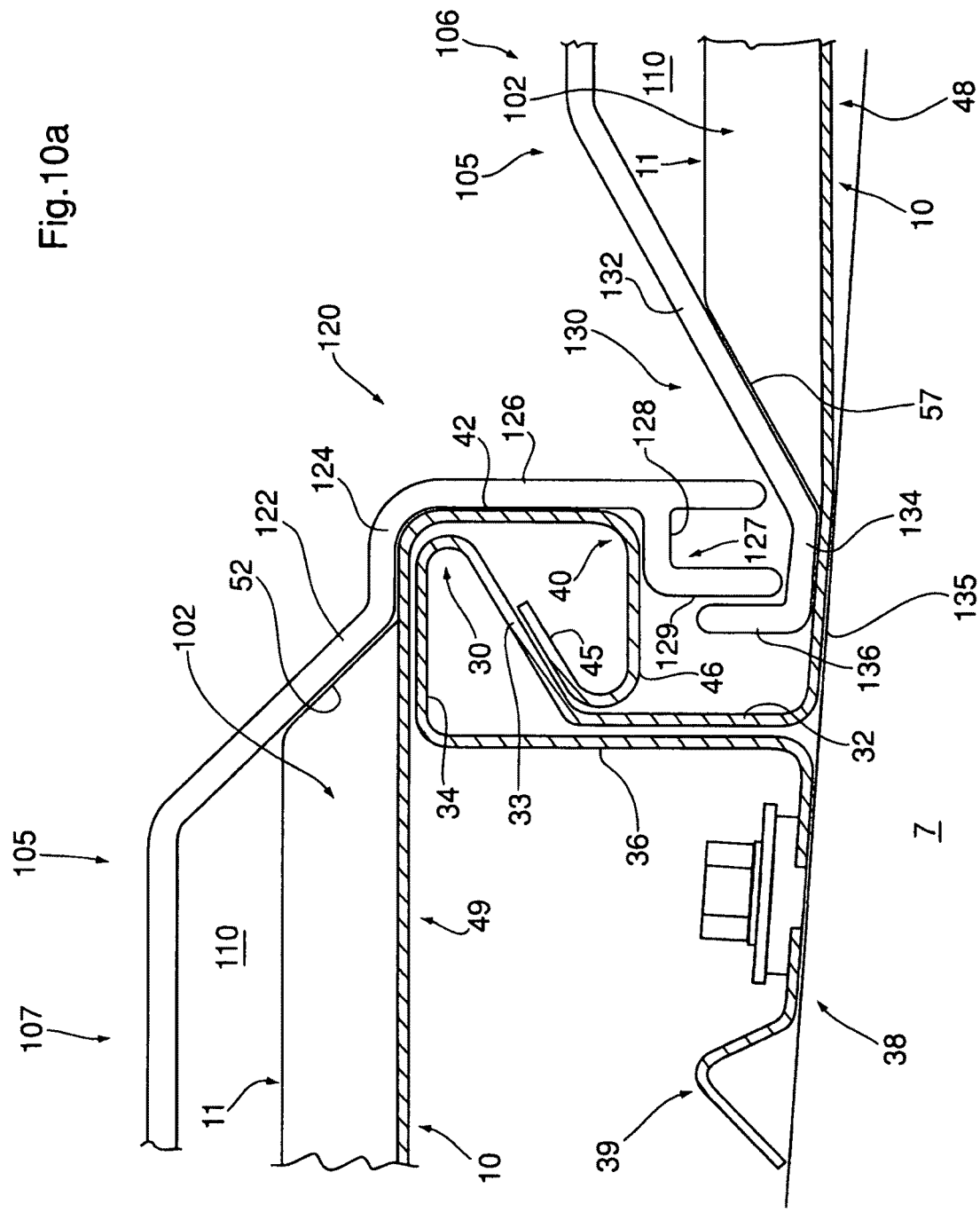
FIG. 10a is a side section view illustration of an embodiment showing the inter-fit of two roof panels and panel covers when assembled on a base.

In an embodiment illustrated in FIG. 10a opposing end portions of a panel cover 105 are shown. Panel covers 105 are preferably constructed of a clear, rigid, plastic (such as a clear polycarbonate resin), and interlock with the panels 10 and to define a volume of trapped air 110 above the panels 10. The panel cover 105 reduces wind cooling and improves heat collection properties of the panels 10, enabling improved heating of the air travelling through the air gap 63, 73. The panel cover 105 also provides further sealing of the joint and screw holes between adjacent panels 10.

Panel cover 105 provides a shield over the upper surface 11 of the panel 10 to improve the thermal collection properties of the panel 10. Panel cover 105 may define a trapped volume of air 110 over the upper surface 11 of the panel 10. The trapped volume of air 110 acts to insulate the upper surface 11 of the panel 10 from outside air and reduce the effect of cooling from the wind.

FIG. 10a illustrates a preferred arrangement for fixing adjacent panel covers 105 in place over adjacent panels 10. Preferably, panel cover 105 comprises opposed edge sections 120, 130 that inter-fit around an engaged support element 30 and cover element 40 pair. The opposed edge sections 120, 130 comprise a panel cover support element 130 and a panel cover lock element 120. The panel cover support element 130 comprises a panel cover sloped portion 132 that rests against rib end 54, panel cover flange portion 134 that rest against panel cover base portion 135 and terminated by an upstanding leg portion 136. The panel cover lock element 120 comprises: a panel cover lock sloped portion 122 that rests against opposed rib end 52; a panel cover lock support portion 124 that rests above the engaged support element 30 and cover element 40 pair; a panel cover lock depending leg 126 that extends past the engaged support element 30 and cover element 40 pair to engage with the panel cover sloped portion 132; and, a panel cover lock tab 127. The panel cover lock tab 127 comprises a dogleg consisting of a first portion 128 that extends from panel cover lock depending leg 126 to engage the lower side of ledge 46 below the engaged support element 30 and cover element 40 pair to resist lifting of the panel cover 105; and, a depending second portion 129 that engages with upstanding leg portion 136 of an adjacent panel cover support element 130.

The upper panel cover 107 of a lower panel 49 may be locked in place by tilting the upper panel cover 107 and locating the panel cover lock tab 127 in the space above the panel cover support element 130 of a lower panel cover 106 and below the engaged support element 30 and cover element 40 pair of the secured upper panel 48 and lower panel 49 pair. Upper panel cover 107 is able to be rotated into position above the second panel 49 so that the panel cover sloped portion 132 of the upper panel cover 107 rests against rib end 54 of the second panel 49 and the panel cover lock sloped portion 122 of the upper panel cover 107 rests against opposed rib end 52 of the second panel 49. The rotation of the upper panel cover 107 with the panel cover lock tab 127 in position engages the panel cover lock depending leg 126 of the upper panel cover 107 with the panel cover sloped portion 132 of the lower panel cover 106 and the panel cover lock tab 127 with the lower side of ledge 46 below the engaged support element 30 and cover element 40 pair and the upstanding leg portion 136 of the lower panel cover 106 locking the upper panel cover 107 in place. This method of attachment avoids through fixing of the panel cover 105 and permits positional adjustment to allow for thermal expansion and contraction.

Figure 10B:
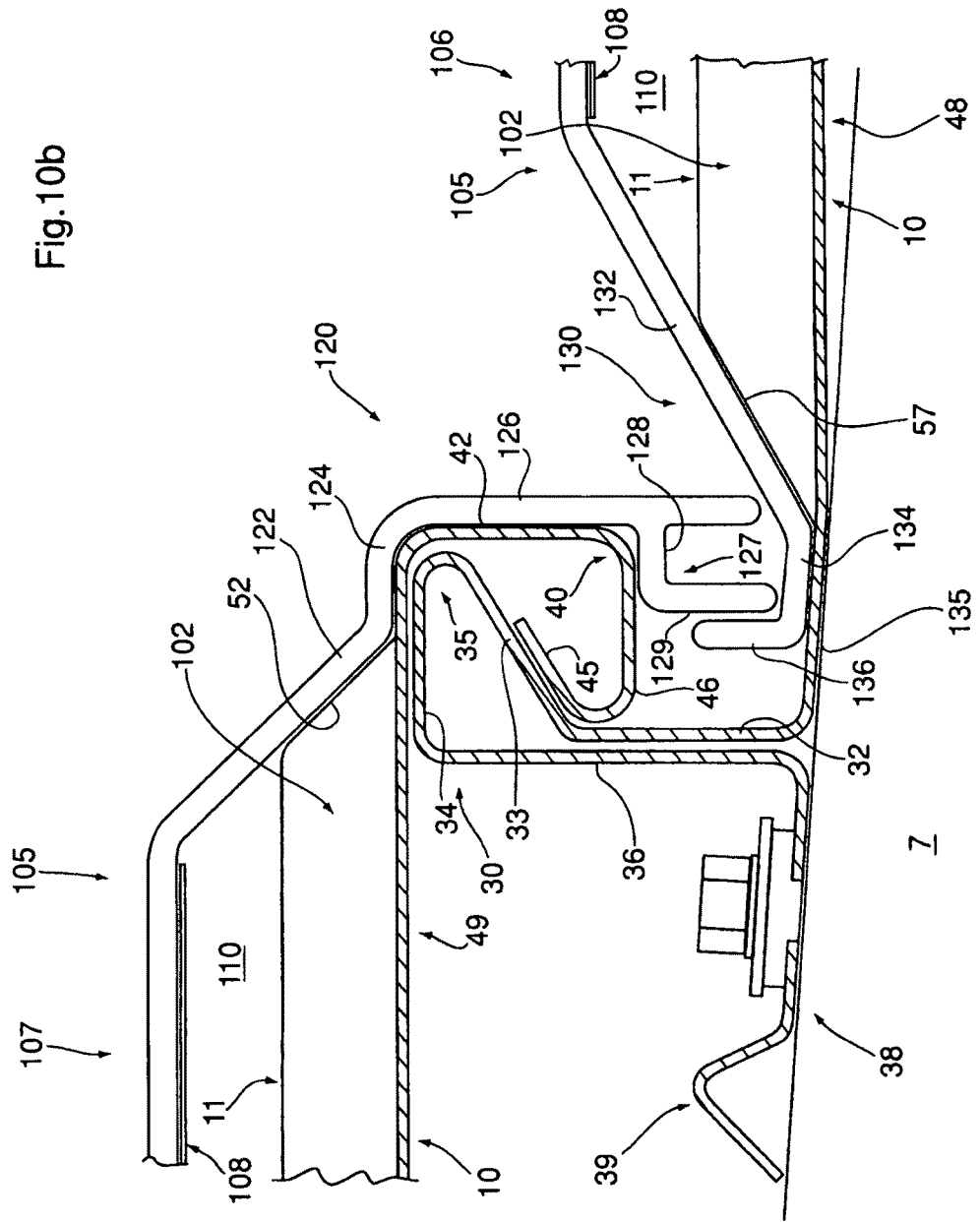
FIG. 10b is a side section view illustration of an embodiment showing the inter-fit of two roof panels, panel covers and photovoltaic membranes when assembled on a base.

FIG. 10b illustrates an alternate embodiment further comprising a thin-film photovoltaic membrane 108 located between the cover 105 and the panel 10. In the embodiment illustrated in FIG. 10b the membrane 108 preferably comprises a semi-transparent thin-film photovoltaic membrane that may be adhesively attached to a lower surface of the cover 105. Placing the membrane 108 inside the cover 105 provides some protection from the elements, improving the operating lifetime of the membrane 108. In an alternate embodiment (not shown), the membrane 108 may be located on the upper surface 11 of the panels 10. The embodiment of FIG. 10b is further illustrated in FIG. 11 an isometric view of the panel 10, cover 105 and membrane 108.

As illustrated in FIG. 12, the side edges of the panels 105 may be joined using a jointing piece 122 preferably formed from moulded plastic. The panels 105 may be positioned over the jointing piece 122 and secured in place by self-drilling screws 123 passing through a washer strip 124 and into the panel 10 and insulation panel 60. The electricity generated from the membrane 108 may be drawn from electrical contacts 126 formed at the edges of the membrane 108. Preferably mating electrical contacts 128 are provided in the jointing piece 122 to contact the electrical contacts 1126 when the cover 105 is fixed in place. The mating electrical contacts 128 are preferably connected to connectors 132 which may be linked to adjoining membranes 108 or conducting wire (not shown) in order to transport the electricity to a convenient connection point.

FIGS. 13 to 16 illustrate a further embodiment where the panels 10 may be adapted to accommodate conventional crystallized silicon module solar collectors 200. The end caps 210 (typically extruded aluminum or plastic) commonly used to frame the solar collectors 200 may be adapted to allow the solar collectors 200 to be secured above the panels 10. In the embodiment illustrated in FIGS. 14 to 16, opposed edge caps 210 may be adapted to securely engage with separate support elements 212, 214, though support elements 212, 214 could also be integrally formed into the end caps 210. The use of separate support elements 212, 214 allows for convenient replacement as necessary.

Figure 13:
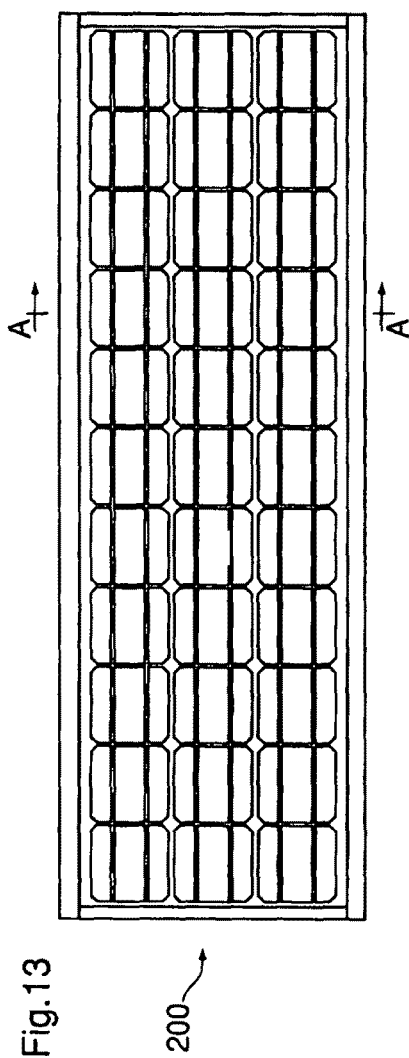
FIG. 13 is a plan view of an embodiment of a solar collector.
Figure 14:
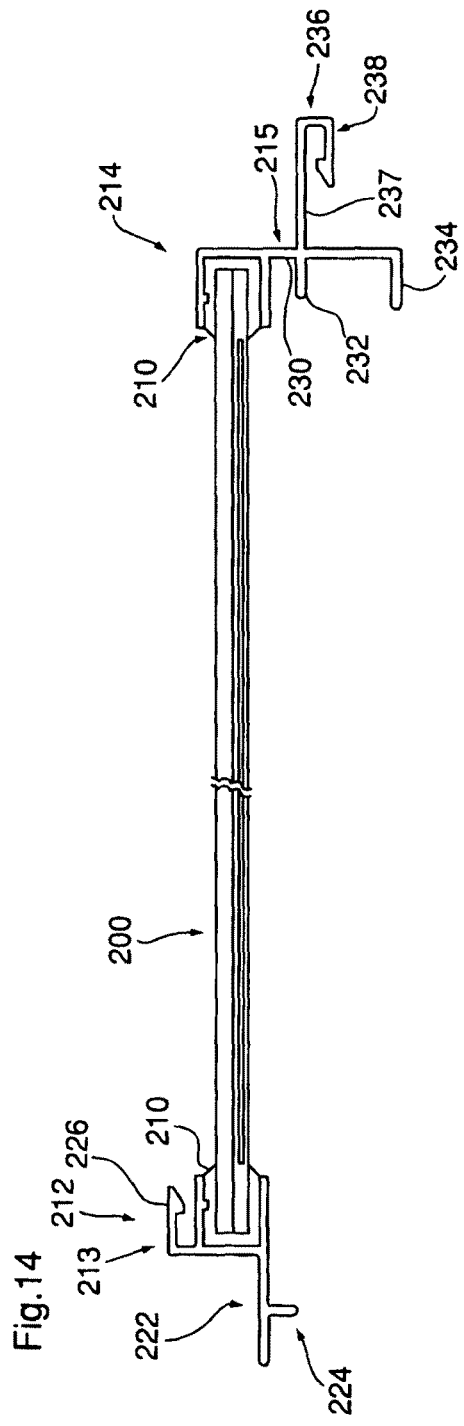
FIG. 14 is a side section view of an embodiment of a solar collector support.
Figure 15:
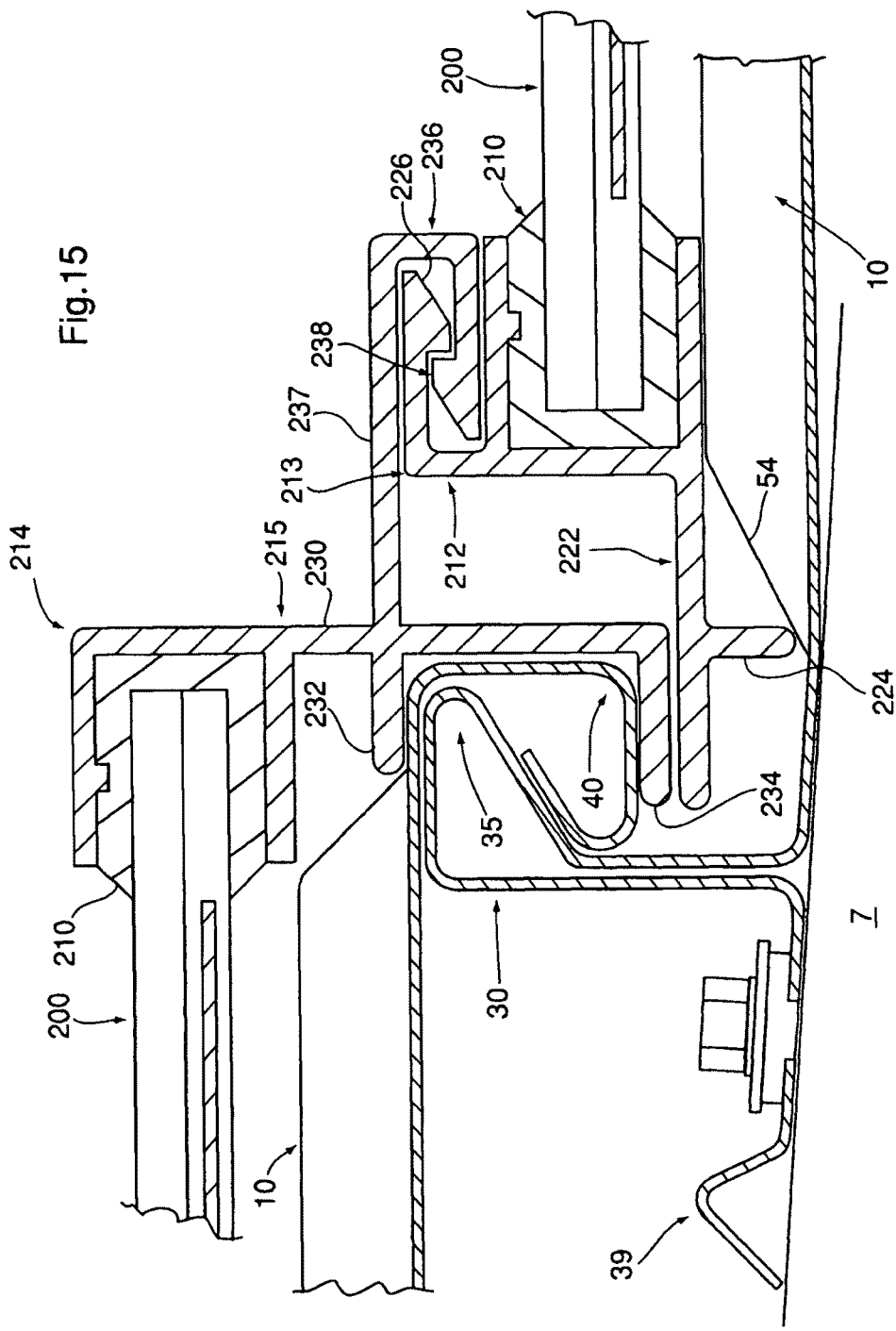
FIG. 15 is a side section view of an embodiment of the inter-fit of two roof panels, two solar collector supports and two solar collectors when assembled on a base.

Referring to FIG. 14, a section view taken along AA in FIG. 13, and FIG. 15, panel 200 and support elements 212, 214 may be described with reference to the underlying panels 10 as installed on a roof 5. Base support element 212 is illustrated engaged around one of the end caps 210. Base support element comprises a flange portion 222 extending from the edge 213 of the panel 200. Preferably the flange portion 222 extends to terminate below the engaged support element 30 and cover element 40 pair. A locking tab 226 extends from the edge 213 above the top surface of the panel 200.

A depending nib 224 extends from the flange portion 222 to engage with the upper surface of the panel 10. The length of the nib 224 in the embodiment illustrated is sized to locate the bottom surface of the support element 212 or the end cap 210 with the upper surface of the panel 10. Preferably the nib 224 is positioned along the flange 222 to locate it in contact with the base of rib end 54 and the top surface of the panel 10 when in place. Locating the nib against the base of the rib end 54 provides additional support against movement when in place.

Cover support element 214 is located along an opposed edge of the panel 200 in relation to base support element 212. Cover support element 214 includes a depending leg 230 that supports a pair of lips 232, 234 that clip around the engaged support element 30 and cover element 40 pair. Preferably the lower lip 234 is also positioned to engage in contact with flange portion 222 of the cover support edge section 212 of an adjacent solar collector 200. Upper lip 232 may also be created as a solid extension from the end cap 210, rather than a separate lip 232. Cover support element 214 further includes a locking member 236 that is adapted to engage and lock with locking tab 226 of an adjacent solar collector 200. Preferably locking member 236 comprises a flange 237 that extends over a a lock 238. Lock 238 comprises a depending leg and tab to surround and engage locking tab 226 of cover support edge section 212 of an adjacent solar collector 200. As illustrated in FIG. 15 this arrangement provides a weather proof joint without any projections or exposed openings which would otherwise be prone to collect precipitation.

As illustrated in the embodiment of FIG. 16, end jointing of the solar collectors 200 may be achieved by the use of a solar collector jointing piece 240. Collectors 200 may be positioned over the jointing piece 240 and secured in place by self-drilling screws 242 passing through washer strip 244 and into the panel 10 and insulation panel 60. Spacer 246 may be provided to seat the panels and jointing piece 240 in a valley of the panels 10 or along side edges 16, 18 of adjacent panels 10.

Figure 17B:
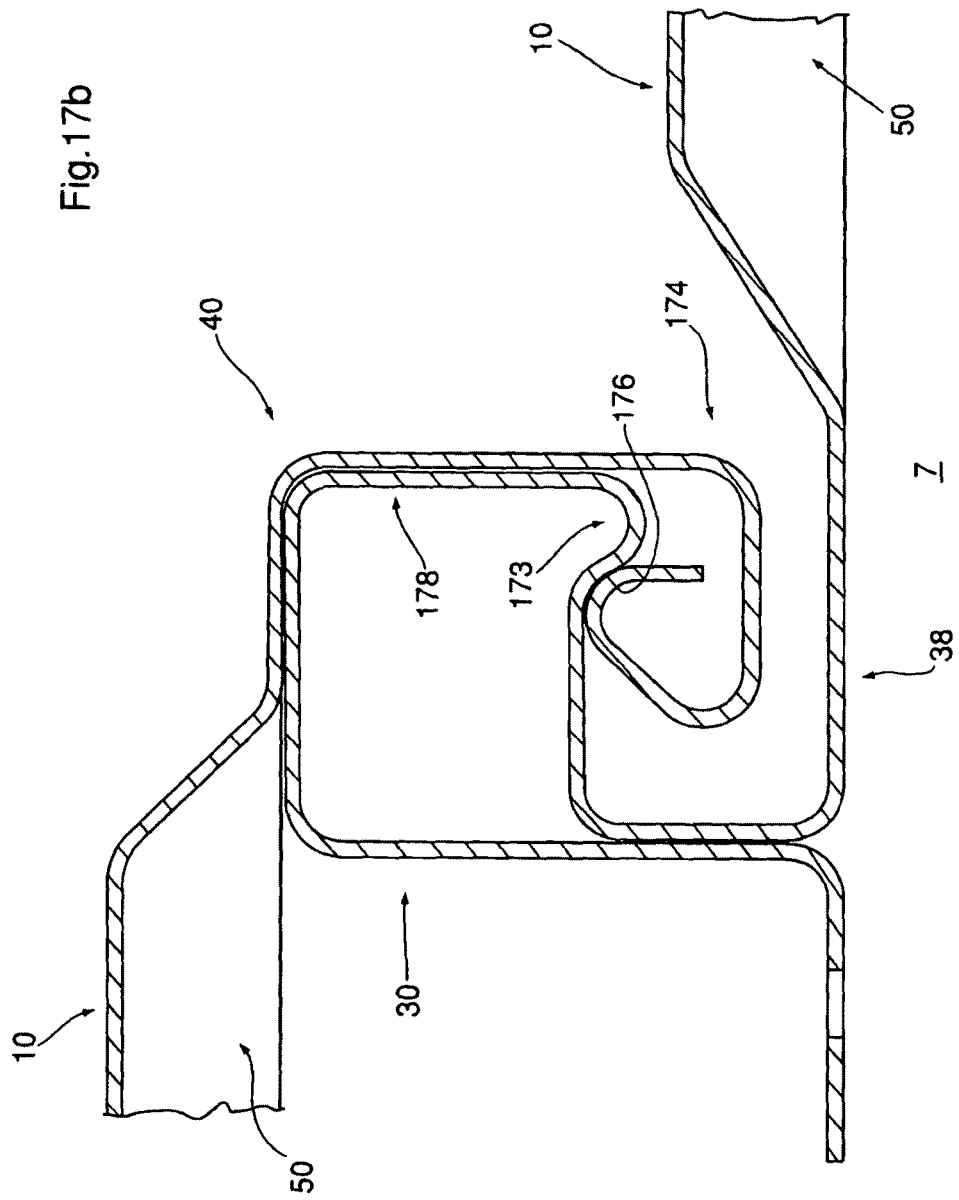

FIGS. 17a, 17b and 17c illustrate alternate embodiments of support element 30 and cover element 40. FIG. 17a illustrates an embodiment where the generally P-shaped support element 30 consists of a projection 172 that has a relatively flat bottom portion to engage with lock segment 162 of the lock element 164. In the embodiment of FIG. 17a an alternate stiffening section 166 is illustrated, as well as a washer element 9 to distribute the load from screw 8 across a larger area of flange element 38. Fastening the support element 30 of a panel 10 to the base 7 will result in a slight rotation being applied to a mating support element 30, providing a positive lock between panels 10.

FIG. 17b illustrates an alternate embodiment of support element 30 and cover element 40. In the embodiment of FIG. 17b a nib 173 is formed into the loop of the projection 178. The lock element 174 extends further down to locate the lock segment 176 against the nib 26. FIG. 17c illustrates a further alternate embodiment of support element 30 and cover element 40. In the embodiment of FIG. 17c a nib 183 includes a recess 185 to locate lock segment 186. In this arrangement lock element 184 does not extend as far down and roughly follows the contours of the underside of the projection 188.

Various embodiments of the present invention having been thus described in detail by way of example, it will be apparent to those skilled in the art that variations and modifications may be made without departing from the invention. The invention includes all such variations and modifications as fall within the scope of the appended claims.

The invention claimed is:

1. A roof panel comprising a panel portion bounded along a support edge by a support edge section and along an opposed cover edge by a cover edge section; the support edge section and the cover edge section bent out of opposed edges of the panel portion;

the support edge section comprises: a flange element located at a distal end of the support edge section, the flange element adapted for receiving fasteners for securing the roof panel to a roof structure, and a support element located between the flange element and the panel portion;

the support element comprising a support ledge resiliently supported at a first end by an upwardly standing wall, said upwardly standing wall supported by the flange element, a second end of the support ledge defining a projection extending towards the panel portion, the second end of the support ledge resiliently supported by an angular portion of a second upwardly standing wall, said second upwardly standing wall supported by the panel portion, thus the support element forms a double-walled, hollow, generally P-shaped structure that connects the panel portion to the flange element, and that is adapted to provide resilient support and locking engagement with the cover edge section of an adjacent panel; and, the cover edge section comprises a cover element and a lock element:

the cover element comprising a portion of the roof panel proximate to the cover edge adapted to rest on the support ledge of the second adjacent panel, a depending leg extending from the portion of the roof panel adapted to extend around and below the projection of the second adjacent panel when in locking engagement;

the lock element adapted to locate a lock segment in resilient contact with the angular portion of the support element of the second adjacent panel when in locking engagement and, when in locking engagement the lock segment making planar contact with the angular portion, imparting a torque to the support element of the second adjacent panel in the direction of the support element of the roof panel when the flange element is secured to the roof section, the cover edge section thus adapted to rest upon and provide resilient sealing and locking engagement with the support edge section of a second adjacent panel.

2. The roof panel of claim 1 wherein the support edge section includes a stiffening section for supporting the roof panel, the stiffening section comprising a rib extending the width of the roof panel.

3. The roof panel of claim 2 wherein the stiffening section is adapted to support the adjacent panel across the width of the roof panel when in locking engagement.

4. The roof panel of claim 1 wherein the flange receives fasteners in a location positioned under the cover edge section of the adjacent panel.

5. The roof panel of claim 1 further comprising a solar collector adapted to inter-fit and lock with engaged support edge section and cover edge section pairs across the width of the roof panel when the roof panel is engaged with the adjacent panel and the second adjacent panel.

6. A roof panel system consisting of interlocking panels, the panels comprising:

a panel portion bounded along a support edge by a support element and a flange element, and bounded along an opposed cover edge by a cover element and a lock element;

the support element comprising a support ledge resiliently supported at a first end by an upwardly standing wall, said upwardly standing wall supported by the flange element, a second end of the support ledge defining a projection extending towards the panel portion, the second end of the support ledge resiliently supported by an angular portion of a second upwardly standing wall, said second upwardly standing wall supported by the panel portion, thus the support element forms a double-walled, hollow, generally P-shaped structure that connects the panel portion to the flange element, and that is adapted to provide resilient support and locking engagement with the cover element of a second adjacent panel;

the cover element comprising a portion of the roof panel proximate to the cover edge adapted to rest on the support ledge of the second adjacent panel, a depending leg extending from the portion of the roof panel adapted to extend around and below the projection of the second adjacent panel when in locking engagement; the lock element adapted to locate a lock segment in resilient contact with the angular portion of the support element of the second adjacent panel when in locking engagement and, when in locking engagement the lock segment making planar contact with the angular portion, imparting a torque to the support element of the second adjacent panel in the direction of the support element of the roof panel when the flange element is secured to the roof section; and, a transparent panel cover for shielding an upper surface of the panel portion and adapted to inter-fit and lock with engaged support element and cover element pairs across the width of the panel when the panel is engaged with the adjacent panel and the second adjacent panel.

7. The roof panel system of claim 6 wherein the transparent panel cover defines a volume of trapped air above the upper surface of the panel portion when the transparent panel cover is inter-fitted and locked in place.

8. The roof panel system of claim 6 further comprising a photovoltaic membrane affixed to a surface of the transparent panel cover.

9. The roof panel system of claim 8 further comprising side joints for sealing opposed side edges of the transparent panel covers; the side joints comprising conductive connectors for distributing power generated by the membrane.

10. The roof panel system of claim 6 wherein an edge section of the transparent panel cover comprises a transparent panel cover support element and an opposed edge section of the transparent panel cover comprises a transparent panel cover lock element;

the transparent panel cover support element adapted to engage with the transparent panel cover lock element of an adjacent transparent panel cover; and, the transparent panel cover lock element adapted to engage with the transparent panel cover support element of a second adjacent transparent panel cover.

11. The roof panel system of claim 6 wherein an edge section of the transparent panel cover comprises a transparent panel cover support element and an opposed edge section of the transparent panel cover comprises a transparent panel cover lock element; the transparent panel cover support element adapted to extend along a support edge section of the panel and terminated by an upstanding leg portion; the transparent panel cover lock element adapted to extend around a cover edge section of the panel and terminated by a depending leg and a lock tab.

12. A roof panel system comprising:

A plurality of inter-fitting roof panels consisting of a panel portion bounded along a support edge by a support edge section and along an opposed cover edge by a cover edge section; the support edge section and the cover edge section bent out of opposed edges of the panel portion;

the support edge section comprises: a flange element located at a distal end of the support edge section, the flange element adapted for receiving fasteners for securing the roof panel to a roof structure, and a support element located between the flange element and the panel portion;

the support element comprising a support ledge resiliently supported at a first end by an upwardly standing wall, said upwardly standing wall supported by the flange element, a second end of the support ledge defining a projection extending towards the panel portion, the second end of the support ledge resiliently supported by an angular portion of a second upwardly standing wall, said second upwardly standing wall supported by the panel portion, thus the support element forms a double-walled, hollow, generally P-shaped structure that connects the panel portion to the flange element, and that is adapted to provide resilient support and locking engagement with the cover edge section of an adjacent panel; and, the cover edge section comprises a cover element and a lock element:

the cover element comprising a portion of the roof panel proximate to the cover edge adapted to rest on the support ledge of the second adjacent panel, a depending leg extending from the portion of the roof panel adapted to extend around and below the projection of the second adjacent panel when in locking engagement;

the lock element adapted to locate a lock segment in resilient contact with the angular portion of the support element of the second adjacent panel when in locking engagement and, when in locking engagement the lock segment making planar contact with the angular portion, imparting a torque to the support element of the second adjacent panel in the direction of the support element of the roof panel when the flange element is secured to the roof section, the cover edge section thus adapted to rest upon and provide resilient sealing and locking engagement with the support edge section of a second adjacent panel; and, supports for supporting the roof panels above an air gap located between the roof panels and a base.

13. The roof panel system of claim 12 wherein the supports comprise one or more insulation panels for fixing to the base, the insulation panels adapted to support the roof panels above air gaps formed by contours in the roof panels.

14. The roof panel system of claim 12 wherein the supports comprise a frame adapted to support the roof panels above the base.

15. A sloped roof structure comprising:

a plurality of rafters supporting a layer of insulation;

a plurality of inter-fitting roof panels supported above the layer of insulation;

each of the plurality of inter-fitting roof panels comprising:

a panel portion bounded along a support edge by a support edge section and along an opposed cover edge by a cover edge section;

the support edge section and the cover edge section bent out of opposed edges of the panel portion;

the support edge section comprises: a flange element located at a distal end of the support edge section, the flange element adapted for receiving fasteners for securing the roof panel to a roof structure, and a support element located between the flange element and the panel portion;

the support element comprising a support ledge resiliently supported at a first end by an upwardly standing wall, said upwardly standing wall supported by the flange element, a second end of the support ledge defining a projection extending towards the panel portion, the second end of the support ledge resiliently supported by an angular portion of a second upwardly standing wall, said second upwardly standing wall supported by the panel portion, thus the support element forms a double-walled, hollow, generally P-shaped structure that connects the panel portion to the flange element, and that is adapted to provide resilient support and locking engagement with the cover edge section of an adjacent panel; and, the cover edge section comprises a cover element and a lock element:

the cover element comprising a portion of the roof panel proximate to the cover edge adapted to rest on the support ledge of the second adjacent panel, a depending leg extending from the portion of the roof panel adapted to extend around and below the projection of the second adjacent panel when in locking engagement; the lock element adapted to locate a lock segment in resilient contact with the angular portion of the support element of the second adjacent panel when in locking engagement and, when in locking engagement the lock segment making planar contact with the angular portion, imparting a torque to the support element of the second adjacent panel in the direction of the support element of the roof panel when the flange element is secured to the roof section, the cover edge section thus adapted to rest upon and provide resilient sealing and locking engagement with the support edge section of a second adjacent panel;

one or more air passageways formed between the plurality of inter-fitting roof panels and the layer of insulation;

the one or more air passageways each supplied by outside air from an eaves of the roof structure; the one or more air passageways each connected at a ridge of the roof to an insulated chamber; and, the insulated chamber adapted to connect the air passageways to a thermal collector for use in the building.

16. The roof structure of claim 15 further comprising a transparent panel cover for at least one of the plurality of roof panels, the panel cover shielding an upper surface of the panel portion and adapted to inter-fit and lock with engaged support edge section and cover edge section pairs across the width of the panel when the panel is engaged with the adjacent panel and the second adjacent panel.

17. The roof structure of claim 16 further comprising a photovoltaic membrane affixed to a surface of at least one panel cover.

18. The roof structure of claim 17 further comprising at least one side joint along a side of the at least one panel cover, the at least one side joint comprising a conductive connector for distributing power generated by the membrane.

19. The roof structure of claim 15 further comprising an air mover to transfer air from the insulated duct to a heat store located in the roof structure.

20. The roof structure of claim 15 further comprising at least one solar collector disposed above one of the panels, the at least one solar collector adapted to inter-fit and lock with engaged support edge section and cover edge section pairs across the width of the one of the panels when the one of the panels is engaged with the adjacent panel and the second adjacent panel.

* * * * *